United States Patent
Jung et al.

(10) Patent No.: US 12,281,841 B2
(45) Date of Patent: Apr. 22, 2025

(54) REFRIGERATOR

(71) Applicant: SAMSUNG ELECTRONICS CO., LTD., Suwon-si (KR)

(72) Inventors: Taeyun Jung, Suwon-si (KR); Donghwa Kim, Suwon-si (KR); Younggon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 17/859,698

(22) Filed: Jul. 7, 2022

(65) Prior Publication Data
US 2023/0079270 A1   Mar. 16, 2023

Related U.S. Application Data

(63) Continuation of application No. PCT/KR2022/008138, filed on Jun. 9, 2022.

(30) Foreign Application Priority Data

Sep. 10, 2021 (KR) .......... 10-2021-0121296
Jan. 6, 2022 (KR) .......... 10-2022-0002008

(51) Int. Cl.
*F25D 23/06* (2006.01)

(52) U.S. Cl.
CPC ......... *F25D 23/063* (2013.01); *F25D 23/069* (2013.01)

(58) Field of Classification Search
CPC .... F25D 23/062; F25D 23/063; F25D 23/065; F25D 23/066; F25D 23/069; F25D 23/085; F25D 2400/04
See application file for complete search history.

(56) References Cited

U.S. PATENT DOCUMENTS

3,627,165 A * 12/1971 Cobb .................. F25D 23/085
                                                    220/592.08
3,868,152 A *  2/1975 Dixon ................. F25D 23/069
                                                    428/192
(Continued)

FOREIGN PATENT DOCUMENTS

CN    201892363 U    7/2011
CN    202032821 U   11/2011
(Continued)

OTHER PUBLICATIONS

Translation CN202032821U (Year: 2011).*
(Continued)

*Primary Examiner* — Andrew Roersma
(74) *Attorney, Agent, or Firm* — STAAS & HALSEY LLP

(57) ABSTRACT

A refrigerator includes a first inner case, a second inner case to be coupled to the first inner case, an outer case coupled to the first inner case and the second inner case, and an insulating material between the outer case, and the first inner case and the second inner case and the outer case. One of the first lower plate and the second upper plate includes an extension extending from the one of the first lower plate and the second upper plate, and a first coupler provided in the extension. An other one of the first lower plate and the second upper plate includes a second coupler to be coupled to the first coupler, and the first lower plate is coupled to the second upper plate by coupling the first coupler to the second coupler to prevent the insulating material from leaking between the first and second couplers.

16 Claims, 21 Drawing Sheets

(56) References Cited

U.S. PATENT DOCUMENTS

| | | | | |
|---|---|---|---|---|
| 6,178,763 | B1 * | 1/2001 | Brancheau | F25D 23/085 219/536 |
| 10,808,989 | B2 * | 10/2020 | Yoon | F25D 11/00 |
| 10,907,885 | B2 | 2/2021 | Jung et al. | |
| 2018/0187957 | A1 * | 7/2018 | Jung | F25D 23/062 |
| 2018/0187961 | A1 * | 7/2018 | Lim | F25D 27/00 |

FOREIGN PATENT DOCUMENTS

| | | | | |
|---|---|---|---|---|
| CN | 105157303 | A | | 12/2015 |
| CN | 106288623 | A * | 1/2017 | F25D 23/028 |
| CN | 108626943 | A | | 10/2018 |
| CN | 112361689 | A | | 2/2021 |
| DE | 102019213446 | A1 * | 3/2021 | |
| EP | 3379182 | A1 * | 9/2018 | F25D 23/067 |
| JP | 62-100482 | | | 6/1987 |
| JP | 4-45023 | | | 10/1992 |
| JP | 2000-304431 | A | | 11/2000 |
| JP | 2016-166693 | | | 9/2016 |
| KR | 20-1996-0009949 | Y1 | | 11/1996 |
| KR | 96-38244 | U | | 12/1996 |
| KR | 20-0125945 | Y1 | | 11/1998 |
| KR | 2001-0017708 | | | 3/2001 |
| KR | 2020090004044 | U * | 4/2009 | |
| KR | 10-1011531 | B1 | | 1/2011 |
| KR | 10-2018-0080054 | | | 7/2018 |
| WO | WO 2016/143258 | A1 | | 9/2016 |

OTHER PUBLICATIONS

Translation JPH0445023Y2 (Year: 1992).*
International Search Report dated Oct. 7, 2022 issued in PCT Application No. PCT/KR2022/008138.
Written Opinion dated Oct. 7, 2022 issued in PCT Application No. PCT/KR2022/008138.
Supplementary European Search Report dated Sep. 23, 2024 issued in European Application No. EP 22 86 7505.

\* cited by examiner

REFRIGERATOR

CROSS-REFERENCE TO RELATED APPLICATION(S)

This application is a continuation application, under 35 U.S.C. § 111(a), of International Patent Application No. PCT/KR2022/008138, filed on Jun. 9, 2022, which claims the priority benefit of Korean Patent Applications No. 10-2021-0121296, filed on Sep. 10, 2021, and No. 10-2022-0002008, filed on Jan. 6, 2022 in the Korean Intellectual Property Office, the disclosures of which are incorporated by reference herein in their entireties

BACKGROUND

1. Field

The disclosure relates to a refrigerator including a pre-manufactured inner case.

2. Description of Related Art

A refrigerator is a device that is composed of a main body including a storage compartment, and a cold air supply system configured to supply cold air to the storage compartment so as to keep food fresh. The storage compartment includes a refrigerating compartment maintained at approximately 0 to 5° C. to store food in a refrigerated manner, and a freezing compartment maintained at approximately 0 to −30° C. to store food in a frozen manner.

An inner case and an outer case are coupled to each other to form the main body of the refrigerator. The inner case forms the storage compartment, and the outer case forms the exterior of the refrigerator. An insulating material for thermal insulation is arranged between the inner case and the outer case. The storage compartment of the refrigerator is provided with an open front side, and the open front side is closed to maintain a temperature of the storage compartment.

Generally, the inner case of the refrigerator is manufactured in a vacuum forming process such that a sheet of resin material is heated and the stretched sheet is put on a mold, and air is suctioned against the mold, and the heated sheet covers the mold or suctioned into the inside of the mold by the suction force.

The inner case formed in the vacuum forming process is not uniform in thickness and has variations. Due to the thickness deviation of the inner case, the quality of the appearance inside the storage compartment may be reduced.

SUMMARY

Therefore, it is an aspect of the disclosure to provide a refrigerator capable of, when loading and storing an inner case, storing a large number of inner cases in the same space by allowing the inner case to be disassembled, and capable of transporting the large number of inner cases at a time.

It is another aspect of the disclosure to provide a refrigerator capable of including an inner case formed by assembling parts formed by an injection molding method.

It is another aspect of the disclosure to provide a refrigerator capable of coupling a pair of inner cases, which is separated from each other, by using a simple structure, without a separate fastening member.

It is another aspect of the disclosure to provide a refrigerator capable of preventing an insulating material, which is foamed in a space between a pair of inner cases, from being leaked through a coupler provided to couple the pair of inner cases to each other.

Additional aspects of the disclosure will be set forth in part in the description which follows and, in part, will be obvious from the description, or may be learned by practice of the disclosure.

In accordance with an aspect of the disclosure, a refrigerator includes a first inner case including a first upper plate, a first lower plate, a first left plate, a first right plate, and a first rear plate, a first storage compartment formed by the first inner case, a second inner case including a second upper plate, a second lower plate, a second left plate, a second right plate, and a second rear plate, and to be coupled to the first inner case, a second storage compartment formed by the second inner case, an outer case coupled to an outer side of the first inner case and an outer side of the second inner case to form an exterior of the refrigerator, and an insulating material provided between the first inner case and the outer case, and between the second inner case and the outer case. One of the first lower plate and the second upper plate includes an extension extending from the one of the first lower plate and the second upper plate, and a first coupler provided in the extension. An other one of the first lower plate and the second upper plate includes a second coupler provided to be coupled to the first coupler, and the first lower plate is coupled to the second upper plate by coupling the first coupler to the second coupler to prevent the insulating material from leaking between the first coupler and the second coupler.

The first coupler may include a first coupling protrusion.

The second coupler may include a first coupling hole corresponding to the first coupling protrusion and to allow at least a portion of the first coupling protrusion to be inserted thereinto.

The second coupler may include a first protrusion having the first coupling hole formed therein and protruding from the second upper plate, and a second protrusion spaced apart from the first protrusion to form a receiving groove between the first protrusion and the second protrusion, and protruding from the second upper plate The first coupling protrusion may include a first sealing surface inclined at a first angle.

The second coupling protrusion may include a second sealing surface provided in the second protrusion of the second coupler, is inclined at the first angle, and to be in contact with the first sealing surface.

The insulating material is prevented from passing between the first sealing surface and the second sealing surface in response to contact between the first sealing surface and the second sealing surface.

The one of first lower plate and the second upper plate may further include a first sealing member arranged on a lateral side of the first coupler.

The other one of the first lower plate and the second upper plate may further include a second sealing member arranged on a lateral side of the second coupler and coupled to the first sealing member to form a sealing space in which the insulating material is received to prevent leakage of the insulating material.

The first sealing member may include a cover forming a front portion thereof, a sealing protrusion forming a lower portion of the sealing member by protruding rearwardly from the cover, and an insertion groove formed on a lower portion of the sealing protrusion.

The second sealing member may include a support arranged under the sealing protrusion to support the sealing protrusion, and an insertion protrusion protruding from the support and provided to be inserted into the insertion groove.

A predetermined free space may be formed between the insertion protrusion and the insertion groove to allow the insertion protrusion to be movable therein in response to insertion of the insertion protrusion into the insertion groove.

The second sealing member may further include a pressing member protruding from a bottom surface of the support.

In response to the pressing member being pressed, the insulating material may be prevented from leaking to an outside of the sealing space through a gap between the sealing protrusion and the support.

The one of the first lower plate and the second upper plate may further include a second coupling protrusion provided on the rear surface of the extension.

The other one of the first lower plate and the second upper plate may further include a coupling groove into which the second coupling protrusion is inserted so that the second upper plate is coupled to the second coupling protrusion.

The one of the first lower plate and the second upper plate may further include a second coupling hole arranged adjacent to a side end of the extension.

The one of second left plate and the second right plate may include a third coupling protrusion corresponding to the second coupling hole to be inserted into the second coupling hole so that the one of the first lower plate and the second upper plate is coupled to the one of the second left plate and the first lower plate is coupled to the other one of the second left plate and the second right plate.

The extension may include a first flange member forming a portion of a front edge of the first inner case, and a second flange member forming a portion of a front edge of the second inner case.

The refrigerator may further include a flange plate coupled to the extension to be arranged between the first flange member and the second flange member.

The flange plate may be connected to the first flange member is connected to the second flange member.

The flange plate may include an engaging protrusion provided on a rear surface of the flange plate.

The extension may further include an engaging hole provided to allow the engaging protrusion to be inserted thereto The engaging protrusion may include an insertion member extending rearwardly from the rear surface of the flange plate and to be inserted into the engaging hole, and a hook extending laterally from the insertion member and engaged to the extension to prevent the flange plate from being separated from the extension.

In accordance with another aspect of the disclosure, a refrigerator may comprises a first inner case including a first upper plate, first side plates, and a first lower plate, a first storage compartment formed by the first inner case, a second inner case including a second upper plate, second side plates, and a second upper plate, a second storage compartment formed by the second inner case, an outer case coupled to an outer side of the first inner case and an outer side of the second inner case to form an exterior of the refrigerator, and an insulating material provided between the first inner case and the outer case, and between the second inner case and the outer case.

The first lower plate may include an extension extending downwardly from the first lower plate, and a first coupling protrusion including a first sealing surface provided in the extension and inclined at a first angle.

The second upper plate may include a coupling hole into which the first coupling protrusion is inserted, and a second sealing surface provided to be in contact with the first sealing surface and inclined at the first angle, and the first sealing surface is in contact with the second sealing surface to prevent the insulting material from leaking between the first lower plate and the second upper plate in response to the insertion of the first coupling protrusion into the coupling hole.

The first lower plate may further include a first sealing member arranged on a lateral side of the first coupler.

The second upper plate may further include a second sealing member arranged on a lateral side of the coupling hole and coupled to the first sealing member to form a sealing space in which the insulating material is received to prevent leakage of the insulating material.

The first lower plate may further include a second coupling protrusion provided on a rear surface of the extension.

The second upper plate may further include a coupling groove provided to allow the second coupling protrusion to be inserted and coupled thereinto.

The extension may include a first flange member forming a portion of a front edge of the first inner case, and a second flange member forming a portion of a front edge of the second inner case.

The refrigerator may further include a flange plate coupled to the extension to be arranged between the first flange member and the second flange member.

The flange plate may be coupled to the extension so as to connect the first flange member to the second flange member.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
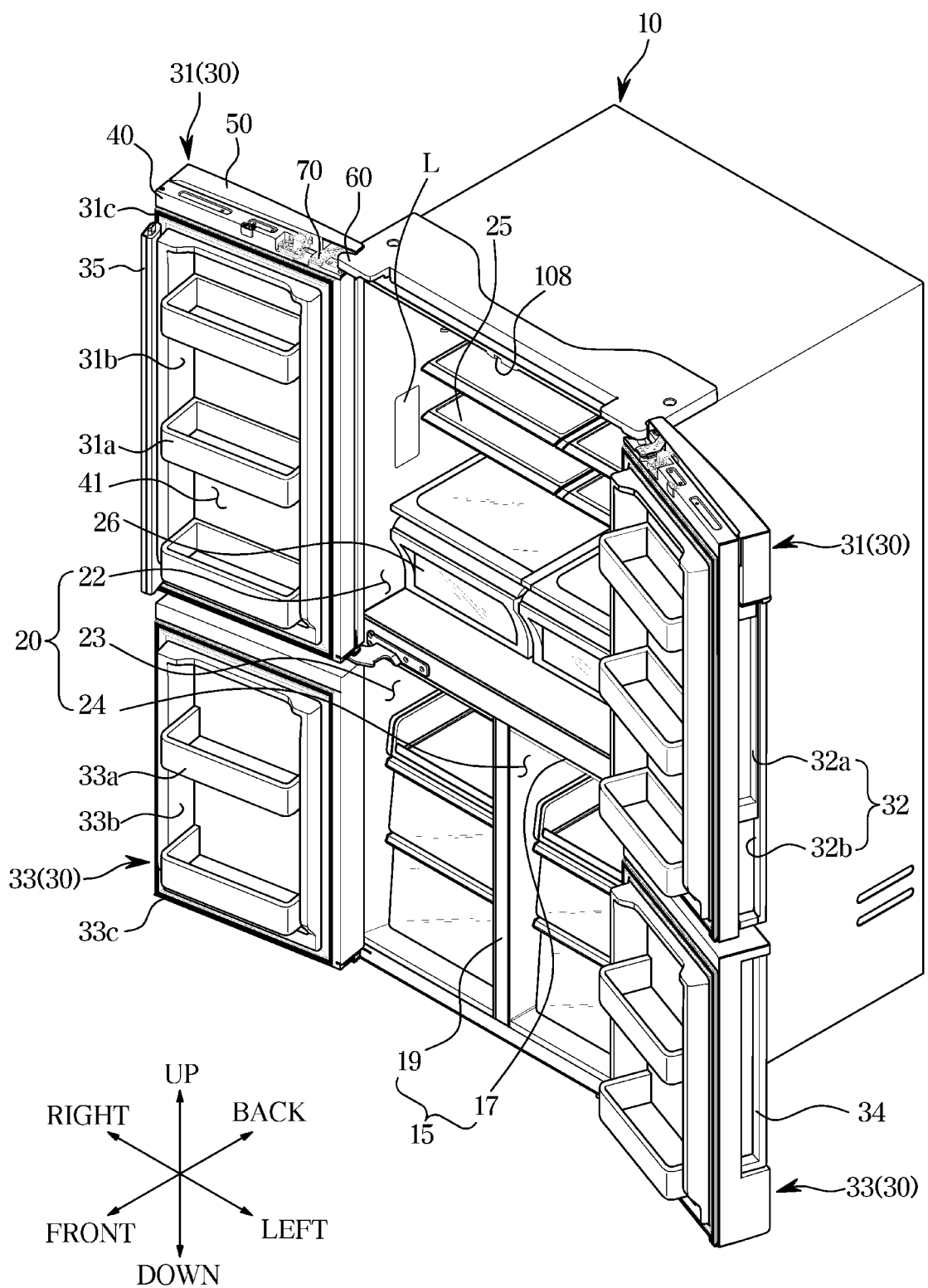
FIG. 1 is a perspective view of a refrigerator according to an embodiment of the disclosure, illustrating a state in which a door is opened.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left", "right" and the like may be defined by the drawings, but the shape and the location of the component is not limited by the term.

The disclosure will be described more fully hereinafter with reference to the accompanying drawings.

Figure 2:
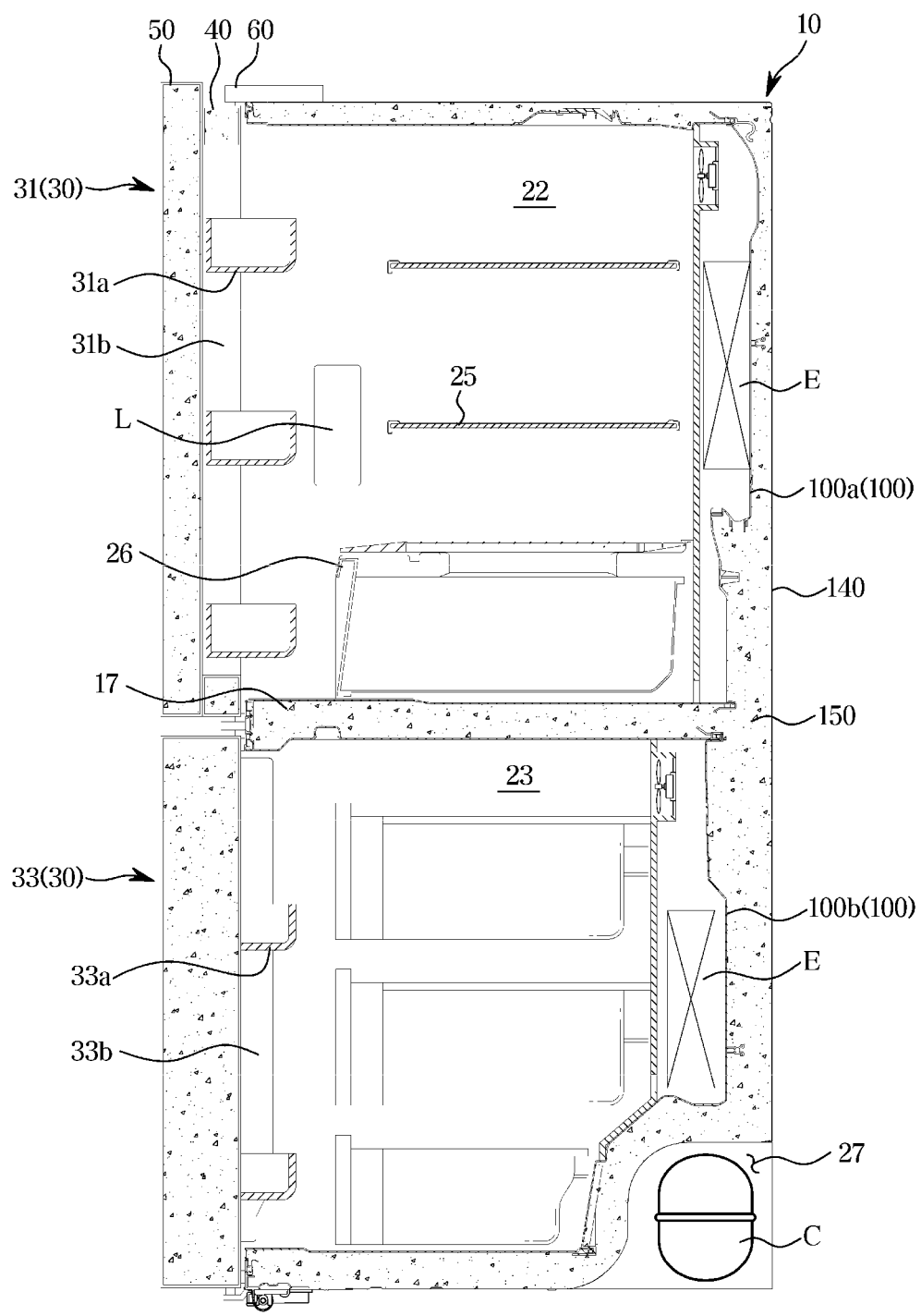
FIG. 2 is a schematic side cross-sectional view of the refrigerator according to an embodiment of the disclosure.

FIG. 1 is a perspective view of a refrigerator according to an embodiment of the disclosure, illustrating a state in which a door is opened. FIG. 2 is a schematic side cross-sectional view of the refrigerator according to an embodiment of the disclosure.

In the description, up, down, left, right, front and rear are defined based on a direction illustrated in FIG. 1.

As illustrated in FIGS. 1 and 2, a refrigerator may include a main body 10, a storage compartment 20 vertically partitioned inside the main body 10, a door 30 configured to open or close the storage compartment 20, and a cold air supply device (not shown) configured to supply cold air to the storage compartment 20.

The main body 10 may include an inner case 100 forming the storage compartment 20, an outer case 140 coupled to an outside of the inner case 100 to form an exterior, and an insulating material 150 foamed between the inner case 100 and the outer case 140 to insulate the storage compartment 20.

A machine room 27, in which a compressor C configured to compress a refrigerant and a condenser (not shown) configured to condense the refrigerant compressed by the compressor C are installed, may be provided at a rear lower portion of the main body 10.

The cold air supply device may include the compressor C configured to compress the refrigerant, the condenser (not shown) configured to condense the refrigerant, an expansion valve (not shown) configured to expand the refrigerant, and an evaporator E configured to evaporate the refrigerant.

The storage compartment 20 may be divided into a plurality by a partition 15, and a plurality of shelves 25 and storage containers 26 may be provided in the storage compartment 20 to store food and the like.

The storage compartment 20 may be divided into a plurality of storage compartments 22, 23, and 24 by the partition 15, and the partition 15 may include a first partition 17 horizontally coupled to the inside of the storage compartment 20 to divide the storage compartment 20 into a first storage compartment 22 and second storage compartments 23 and 24, and a second partition 19 vertically coupled to the inside of the second storage compartments 23 and 24 to divide the second storage compartments 23 and 24 into a first lower storage compartment 23 and a second lower storage compartment 24.

The partition 15 including a T-shape formed by the first partition 17 and the second partition 19 coupled to each other may divide the storage compartment 20 into three spaces. Among the first storage compartment 22 and the second storage compartments 23 and 24 divided by the first partition 17, the first storage compartment 22 may be used as a refrigerating compartment, and the second storage compartments 23 and 24 may be used as a freezing compartment.

All the second storage compartments 23 and 24 may be used as the freezing compartment. Alternatively, the first lower storage compartment 23 may be used as the freezing compartment and the second lower storage compartment 24 may be used as the refrigerating compartment. Alternatively, the first lower storage compartment 23 may be used as the freezing compartment, and the second lower storage compartment 24 may be used as the freezing compartment and the refrigerating compartment.

The division of the storage compartment 20 as described above is an example, and each storage compartment 22, 23, and 24 may be used differently from the above configuration.

The refrigerating compartment 22 and the freezing compartments 23 and 24 may be opened or closed by the door 30 rotatably coupled to the main body 10, respectively.

The door 30 may include a pair of refrigerating compartment doors 31 rotatably coupled to the main body 10 to open or close the refrigerating compartment 22, and a pair of freezing compartment doors 33 rotatably coupled to the main body 10 to open or close the freezing compartments 23 and 24.

The pair of refrigerating compartment doors 31 may be respectively opened or closed through a pair of refrigerating compartment door handles 32 including a first door handle 32a or a second door handle 32b. The refrigerating compartment 22 may be opened or closed by the pair of refrigerating compartment doors 31, and a rotating rod 35 may be installed on at least one of the pair of refrigerating compartment doors 31 so as to seal between the pair of refrigerating compartment doors 31 without a gap therebetween which may occur in response to closing the refrigerating compartment doors 31. The rotating rod 35 may be rotatably coupled to at least one of the pair of refrigerating compartment doors 31. The rotating rod 35 may be guided by a rotation guide 108 formed on the inner case 100, so as to rotate according to the opening and closing of the refrigerating compartment door 31.

The pair of freezing compartment doors 33 may be respectively. opened or closed by a freezing compartment door handle 34. A sliding door may be applied to the door configured to open or close the freezing compartments 23 and 24.

Door shelves 31a and 33a in which food is stored may be provided on rear surfaces of the pair of refrigerating compartment doors 31 and the pair of freezing compartment doors 33, respectively.

The door shelves 31a and 33a may respectively include shelf supports 31b and 33b extending vertically from the doors 31 and 33 to support each of the door shelves 31a and 33a on left and right sides of each of the door shelves 31a and 33a. The shelf supports 31b and 33b may extend from the doors 31 and 33, respectively. The shelf supports 31b and 33b may be detachably provided on each door 31 and 33 as a separate configuration.

In addition, first gaskets 31c and 33c may be provided on the rear edge of each door 31 and 33 to seal a gap with the main body 10 in response to the close of the doors 31 and 33. The first gaskets 31c and 33c may be installed in a loop shape along the edges on the rear surface of each door 31 and 33, and a magnet (not shown) may be included in the first gaskets 31c and 33c.

The pair of refrigerating compartment doors 31 configured to open or close the refrigerating compartment 22 may be arranged left and right. Hereinafter for convenience of description, only the refrigerating compartment door 31 arranged on the left side of the drawing will be described, and the refrigerating compartment door 31 arranged on the left side of the drawing will be referred to as the refrigerating compartment door 31. However, the refrigerating compartment door 31 described below is not limited to the refrigerating compartment door 31 arranged on the left side of the drawing, but may also be applied to the refrigerating compartment door 31 arranged on the right side of the drawing, and applied to at least one of the pair of freezing compartment doors 33.

The refrigerating compartment door 31 may be provided as a double door including a first door 40 and a second door 50.

The first door 40 may be rotatably connected to the main body 10 by a first hinge 60 so as to open or close the refrigerating compartment 22. The above-described door shelf 31a, shelf support 31b, and first gasket 31c may be provided on the first door 40.

The first door 40 may include an opening 41 that is formed to allow a user to approach the door shelf 31a to insert or withdraw food while the first door 40 is closed. The opening 41 may be formed to pass through the first door 40 and may be opened or closed by the second door 50.

The second door 50 may be provided in front of the first door 40 to open or close the opening 41 of the first door 40, and the second door 50 may be rotatable in the same direction as the first door 40. Although the drawing illustrates that the second door 50 is rotatably supported by a second hinge 70 installed on the first door 40 and is rotatable with respect to the first door 40, the disclosure is not limited thereto. The second door 50 may be rotatable about the main body 10 because the second hinge 70 is installed on the main body 10.

The second door 50 may include a second gasket (not shown) for maintaining airtightness with the first door 40. The second gasket may be installed in a loop shape along an edge of a rear surface of the second door 50, and a magnet (not shown) may be included therein.

Figure 3:
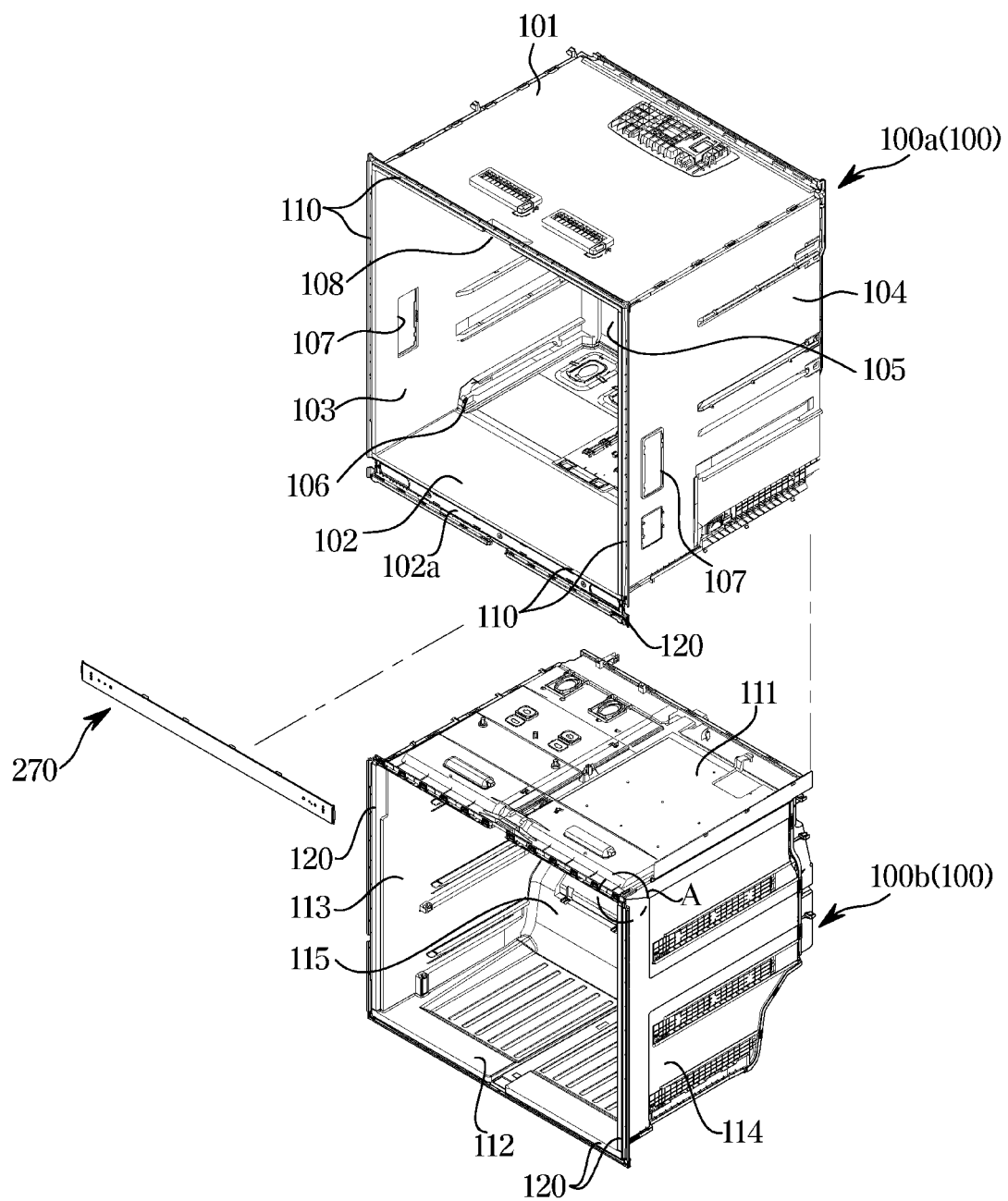
FIG. 3 is a view illustrating a state in which a first inner case and a second inner case are separated from each other in the refrigerator according to an embodiment of the disclosure.
Figure 4:
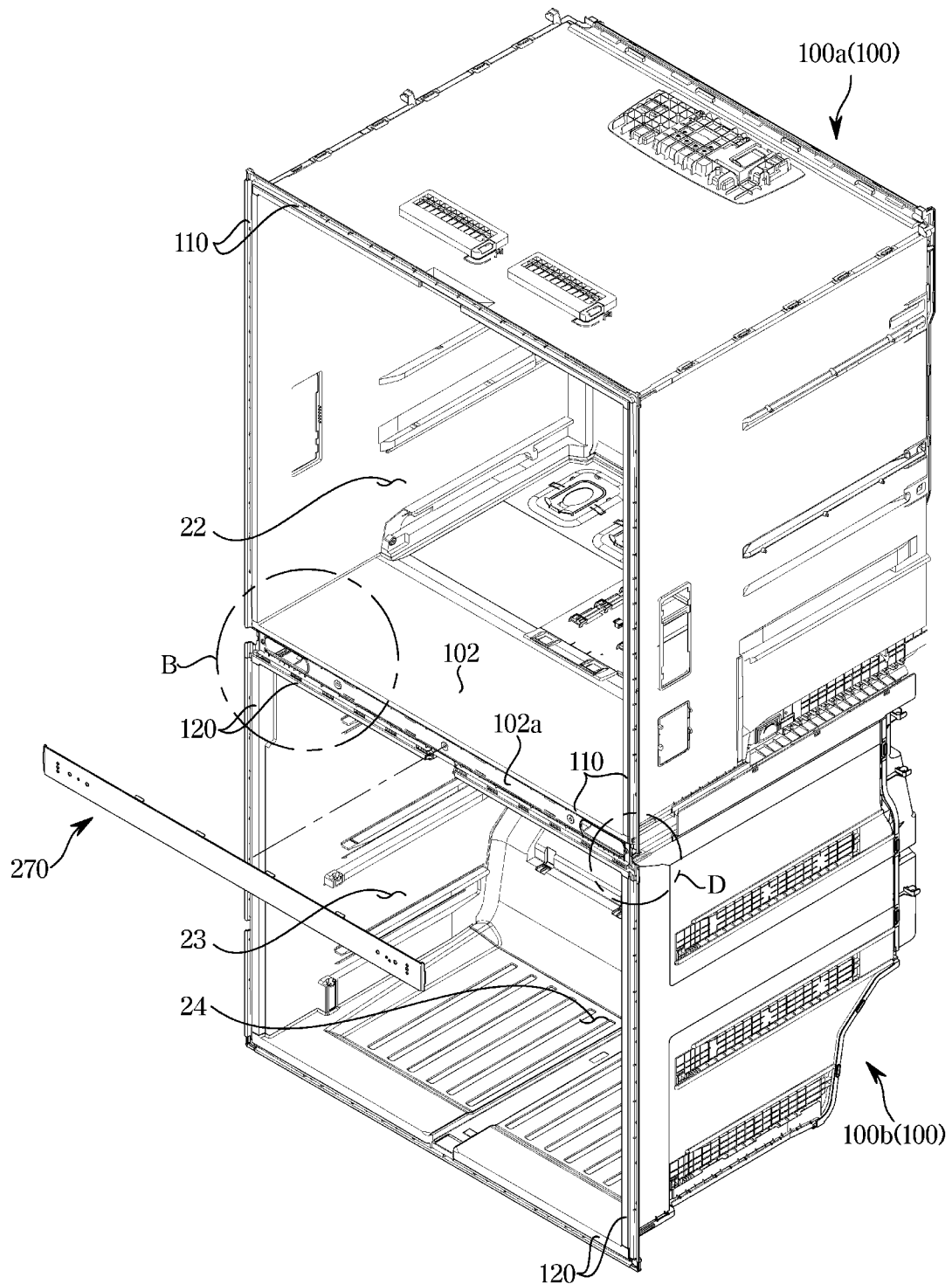
FIG. 4 is a view illustrating a state in which the first inner case and the second inner case are coupled to each other in the refrigerator according to an embodiment of the disclosure.

FIG. 3 is a view illustrating a state in which a first inner case and a second inner case are separated from each other in the refrigerator according to an embodiment of the disclosure. FIG. 4 is a view illustrating a state in which the first inner case and the second inner case are coupled to each other in the refrigerator according to an embodiment of the disclosure.

Referring to FIGS. 3 and 4, the refrigerator according to the disclosure may include a first inner case 100a and a second inner case 100b. The first inner case 100a and the second inner case 100b may be provided to be coupled to each other. The first inner case 100a and the second inner case 100b may be coupled to each other to form the inner case 100.

The first inner case 100a and the second inner case 100b may be coupled to each other without a separate fastening member such as a screw. The first inner case 100a and the second inner case 100b may be provided not to be separated after being coupled to each other. This will be described later.

Figure 5:
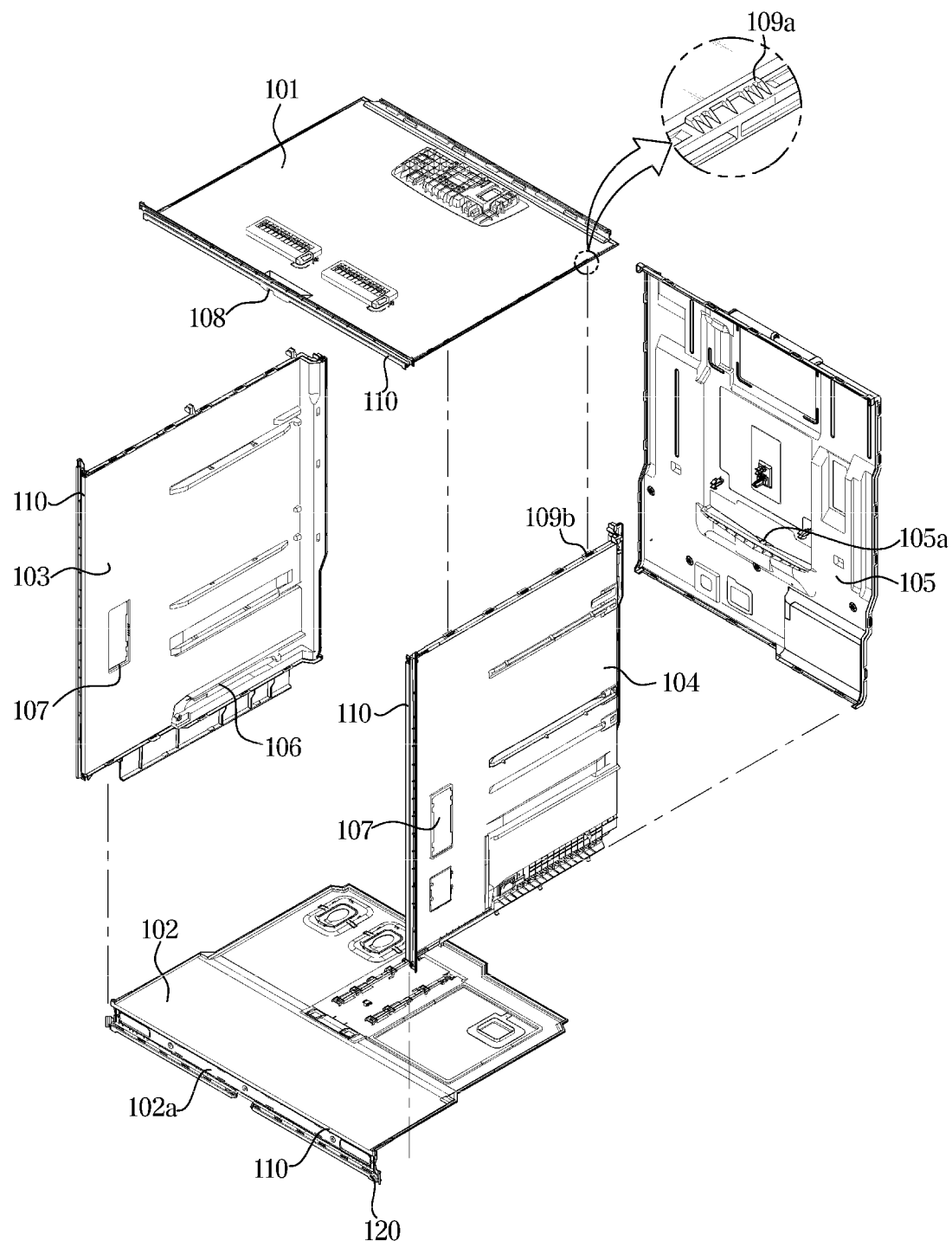
FIG. 5 is a view illustrating a state in which the first inner case is disassembled in the refrigerator according to an embodiment of the disclosure.
Figure 6:
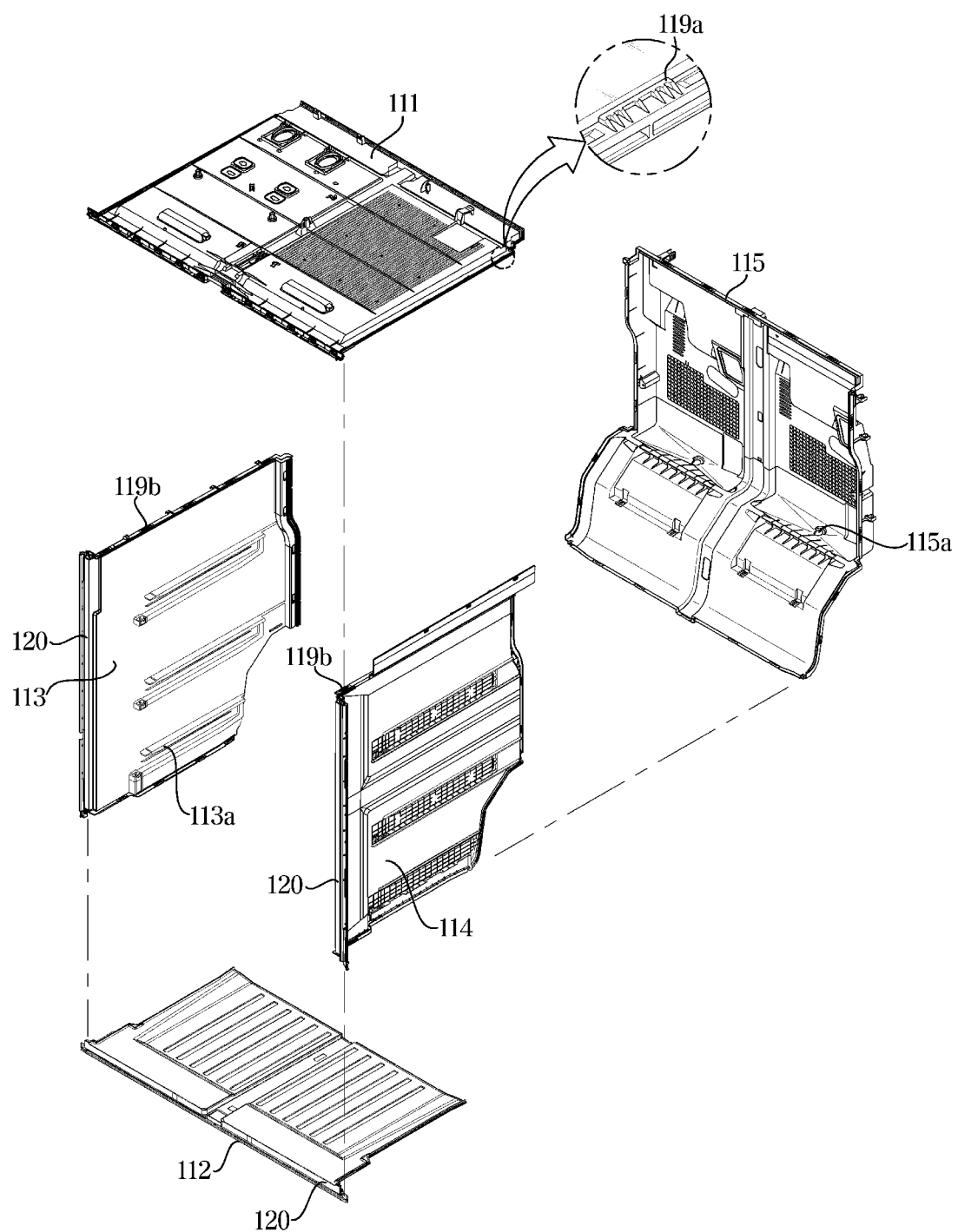
FIG. 6 is a view illustrating a state in which the second inner case is disassembled in the refrigerator according to an embodiment of the disclosure.

FIG. 5 is a view illustrating a state in which the first inner case is disassembled in the refrigerator according to an embodiment of the disclosure. FIG. 6 is a view illustrating a state in which the second inner case is disassembled in the refrigerator according to an embodiment of the disclosure.

Referring to FIGS. 5 and 6, the inner case 100 may include the first inner case 100a forming the refrigerating compartment 22 positioned above the freezing compartments 23 and 24, and the second inner case 100b forming the freezing compartments 23 and 24 positioned below the refrigerating compartment 22. The first inner case 100a and the second inner case 100b may be coupled by the same coupling structure in which only the shapes are partially different.

Referring FIG. 5, the first inner case 100a according to an embodiment may include a plurality of first plates 101, 102, 103, 104, and 105. The first inner case 100a may be formed by coupling the plurality of first plates 101, 102, 103, 104, and 105. The plurality of first plates 101, 102, 103, 104, and 105 may be coupled to each other without a separate fastening member. That is, each of the plurality of first plates 101, 102, 103, 104, and 105 may include a coupler integrally formed for mutual coupling.

The plurality of first plates 101, 102, 103, 104, and 105 may be formed of a resin material through an injection molding method. Each of the plurality of first plates 101, 102, 103, 104, and 105 may include four edges. The plurality of first plates 101, 102, 103, 104, and 105 may include a first upper plate 101, a first lower plate 102, a first left plate 103, a first right plate 104, and a first rear plate 105.

The first upper plate 101 may form an upper surface of the first storage compartment 22. The first lower plate 102 may form a lower surface of the first storage compartment 22. The first left plate 103 may form a left surface of the first storage compartment 22. The first right plate 104 may form a right surface of the first storage compartment 22. The first rear plate 105 may form a rear surface of the first storage compartment 22.

A shape of the first upper plate 101, the first lower plate 102, the first left plate 103, the first right plate 104 and the first rear plate 105 is not limited to a flat shape without a curve. Alternatively, the first upper plate 101, the first lower plate 102, the first left plate 103, the first right plate 104 and the first rear plate 105 may include a curve. Therefore, the first upper plate 101, the first lower plate 102, the first left plate 103, the first right plate 104 and the first rear plate 105 may include various shapes as long as forming the upper surface, the lower surface, the left surface, the right surface and the rear surface of the first storage compartment 22.

In addition, unlike the embodiment, at least two or more plates adjacent to each other among the first upper plate 101, the first lower plate 102, the first left plate 103, the first right plate 104, and the first rear plate 105 may be integrally formed with each other.

That is, unlike the embodiment, the first inner case 100a may be formed of a number of parts less than the five parts corresponding to the first upper plate 101, the first lower plate 102, the first left plate 103, the first right plate 104, and the first rear plate 105.

For example, the first upper plate 101 and the first right plate 104 may be integrally injection-molded, and the first lower plate 102 and the first left plate 103 may be integrally injection-molded. Alternatively, the first upper plate 101 and the first left plate 103 may be integrally injection-molded, and the first lower plate 102 and the first right plate 104 may be integrally injection-molded.

Even when the first inner case 100a is formed of a number of parts less than the five parts corresponding to the first upper plate 101, the first lower plate 102, the first left plate 103, the first right plate 104, and the first rear plate 105, as described above, descriptions described below may be equally applied.

The first inner case 100a may include the first upper plate 101, the first lower plate 102, the first left plate 103, the first right plate 104, and the first rear plate 105. The first upper plate 101, the first lower plate 102, the first left plate 103, the first right plate 104, and the first rear plate 105 may be provided to be separated from each other. The first upper plate 101, the first lower plate 102, the first left plate 103, the first right plate 104, and the first rear plate 105 may be injection molded. The first upper plate 101, the first lower plate 102, the first left plate 103, the first right plate 104, and the first rear plate 105 provided to be separated may be assembled to form the first inner case 100a. Because the first upper plate 101, the first lower plate 102, the first left plate 103, the first right plate 104, and the first rear plate 105 are injection molded, the first upper plate 101, the first lower plate 102, the first left plate 103, the first right plate 104, and the first rear plate 105 may be molded to have various patterns (not shown) without an additional post-process. Further, the first upper plate 101, the first lower plate 102, the first left plate 103, the first right plate 104, and the first rear plate 105 may be molded to have various colors. That is, the first upper plate 101, the first lower plate 102, the first left plate 103, the first right plate 104, and the first rear plate 105 may have a different pattern or a different color for each purpose of the storage compartment 20. In addition, the first upper plate 101, the first lower plate 102, the first left plate 103, the first right plate 104, and the first rear plate 105 may all have different patterns or different colors. Accordingly, for the user choice in the refrigerator, it is possible to widen a range of selection.

A first flange member 110 forming a part of a front flange may be integrally formed on the first upper plate 101, the first lower plate 102, the first left plate 103, and the first right plate 104. The front flange may refer to a flat portion provided along a front edge of the first inner case 100a. According to an embodiment, based on the injection molding of the first upper plate 101, the first lower plate 102, the first left plate 103, and the first right plate 104, the first flange member 110 may be integrally formed with the first upper plate 101, the first lower plate 102, the first left plate 103, and the first right plate 104.

The rotation guide 108 provided to guide the rotating rod 35, which is rotatably coupled to the pair of refrigerating compartment doors 31, to rotate according to the rotation of the refrigerating compartment door 31 may be injection-molded integrally with a lower surface of the first upper plate 101. A lamp case 107 in which a light emitting diode LED (L) (refer to FIG. 1) may be injection-molded integrally with the first left plate 103 and the first right plate 104.

The first left plate 103 and the first right plate 104 may be injection-molded integrally with a rail 106 in which the storage container 26 is supported to slidably move.

The first rear plate 105 is injection molded into a thin film to have competitiveness in material cost, and for this, a plurality of gates (not shown) may be required. The first rear plate 105 may include a drain hole 105a provided to drain the condensed water or defrost water falling from the evaporator E.

A plurality of assembly hooks 109a or a plurality of assembly holes 109b for assembly may be formed on the first upper plate 101, the first lower plate 102, the first left plate 103, the first right plate 104, and the first plate 105. The first upper plate 101, the first lower plate 102, the first left plate 103, and the first right plate 104 may be assembled to each other through the remaining three edge surfaces, excluding the front, of the four edge surfaces. Accordingly, the plurality of assembly hooks 109a or the plurality of assembly holes 109b may be formed on the remaining three edge surfaces, excluding the front, of the four edge surfaces of the first upper plate 101, the first lower plate 102, the first left plate 103, and the first right plate 104. Further, the plurality of assembly hooks 109a or the plurality of assembly holes 109b may be formed on all the four edge surfaces of the first rear plate 105. That is, when the assembly of the first upper plate 101 and the first right plate 104 is described as an example, the plurality of assembly hooks 109a may be formed on a right surface of the first upper plate 101, and the plurality of assembly holes 109b may be formed on an upper surface of the first right plate 104 assembled to the right surface of the first upper plate 101. Although it is shown in the drawing that the plurality of assembly hooks 109a is formed on the right surface of the first upper plate 101 and the plurality of assembly holes 109b is formed on the upper surface of the first right plate 104, the plurality of assembly holes 109b may be formed on the right surface of the first upper plate 101, and the plurality of assembly hooks 109a may formed on the upper surface of the first right plate 104. As for the first lower plate 102, the plurality of assembly hooks 109a may be formed on the lower side of the three edge surfaces, and thus the plurality of assembly hooks 109a may not be shown in the drawing.

Referring FIG. 6, the second inner case 100b according to an embodiment may include a plurality of second plates 111, 112, 113, 114, and 115. The second inner case 100b may be formed by coupling the plurality of second plates 111, 112, 113, 114, and 115. The plurality of second plates 111, 112, 113, 114, and 115 may be coupled to each other without a separate fastening member. That is, each of the plurality of second plates 111, 112, 113, 114, and 115 may include a coupler integrally formed for mutual coupling.

The plurality of second plates 111, 112, 113, 114, and 115 may be formed of a resin material through an injection molding method. Each of the plurality of second plates 111, 112, 113, 114, and 115 may include four edges. The plurality of second plates 111, 112, 113, 114, and 115 may include a second upper plate 111, a second lower plate 112, a second left plate 113, a second right plate 114, and a second rear plate 115.

The second upper plate 111 may form an upper surface of the second storage compartments 23 and 24. The second lower plate 112 may form a lower surface of the second storage compartments 23 and 24. The second left plate 113 may form a left surface of the second storage compartments 23 and 24. The second right plate 114 may form a right surface of the second storage compartments 23 and 24. The second rear plate 115 may form a rear surface of the second storage compartments 23 and 24.

A shape of the second upper plate 111, the second lower plate 112, the second left plate 113, the second right plate 104 and the second rear plate 115 is not limited to a flat shape without a curve. Alternatively, the second upper plate 111, the second lower plate 112, the second left plate 113, the second right plate 114 and the second rear plate 115 may include a curve. Therefore, the second upper plate 111, the second lower plate 112, the second left plate 113, the second right plate 104 and the second rear plate 115 may include various shapes as long as forming the upper surface, the lower surface, the left surface, the right surface and the rear surface of the second storage compartments 23 and 24.

In addition, unlike the embodiment, at least two or more plates adjacent to each other among the second upper plate 111, the second lower plate 112, the second left plate 113, the second right plate 114 and the second rear plate 115 may be integrally formed with each other.

That is, unlike the embodiment, the second inner case 100b may be formed of a number of parts less than the five parts corresponding to the second upper plate 111, the second lower plate 112, the second left plate 113, the second right plate 114 and the second rear plate 115.

For example, the second upper plate 111 and the second right plate 114 may be integrally injection-molded, and the second lower plate 112 and the second left plate 113 may be integrally injection-molded. Alternatively, the second upper plate 111 and the second left plate 113 may be integrally injection-molded, and the second lower plate 112 and the second right plate 114 may be integrally injection-molded.

Even when the second inner case 100b is formed of a number of parts less than the five parts corresponding to the second upper plate 111, the second lower plate 112, the second left plate 113, the second right plate 114 and the second rear plate 115, as described above, descriptions described below may be equally applied.

The second inner case 100b may include the second upper plate 111, the second lower plate 112, the second left plate 113, the second right plate 114 and the second rear plate 115, in the same manner as the first inner case 100a. The second upper plate 111, the second lower plate 112, the second left plate 113, the second right plate 114 and the second rear plate 115 may be provided to be separated from each other. The second upper plate 111, the second lower plate 112, the second left plate 113, the second right plate 114 and the second rear plate 115 may be injection molded. The second upper plate 111, the second lower plate 112, the second left plate 113, the second right plate 114 and the second rear plate 115 provided to be separated may be assembled to form the second inner case 100b. Because the second upper plate 111, the second lower plate 112, the second left plate 113, the second right plate 114 and the second rear plate 115 are injection molded, the second upper plate 111, the second lower plate 112, the second left plate 113, the second right plate 114 and the second rear plate 115 may be molded to have various patterns (not shown) without an additional post-process. Further, the second upper plate 111, the second lower plate 112, the second left plate 113, the second right plate 114 and the second rear plate 115 may be molded to have various colors. That is, the second upper plate 111, the second lower plate 112, the second left plate 113, the second right plate 114 and the second rear plate 115 may have a different pattern or a different color for each purpose of the storage compartment 20. In addition, the second upper plate 111, the second lower plate 112, the second left plate 113, the second right plate 114 and the second rear plate 115 may all have different patterns or different colors. Accordingly, for the user choice in the refrigerator, it is possible to widen a range of selection.

A second flange member 120 forming a part of a front flange may be integrally formed on the second lower plate 112, the second left plate 113, and the second right plate 114. The front flange may refer to a flat portion provided along a front edge of the second inner case 100b. According to an embodiment, based on the injection molding of the second lower plate 112, the second left plate 113, and the second right plate 114, the second flange member 120 may be integrally formed with the second lower plate 112, the second left plate 113, and the second right plate 114. According to an embodiment, the second flange member 120 may be not provided in the second upper plate 111. This is because the second flange member 120 is provided in the first lower plate 102.

The second left plate 113 and the second right plate 114 may be injection-molded integrally with a rail 113a in which the storage container is supported to slidably move.

The second rear plate 115 is injection molded into a thin film to have competitiveness in material cost, and for this, a plurality of gates (not shown) may be required. The second rear plate 115 may include a drain hole 115a provided to drain the condensed water or defrost water falling from the evaporator E.

According to an embodiment, a plurality of assembly hooks 119a or a plurality of assembly holes 119b for assembly may be formed on the second upper plate 111, the second lower plate 112, the second left plate 113, the second right plate 114 and the second rear plate 115. The second upper plate 111, the second lower plate 112, the second left plate 113, and the second right plate 114 may be assembled to each other through the remaining three edge surfaces, excluding the front, of the four edge surfaces. Accordingly, the plurality of assembly hooks 119a or the plurality of assembly holes 119b may be formed on the remaining three edge surfaces, excluding the front, of the four edge surfaces of the second upper plate 111, the second lower plate 112, the second left plate 113, and the second right plate 114. Further, the plurality of assembly hooks 119a or the plurality of assembly holes 119*b* may be formed on all the four edge surfaces of the second rear plate 115. That is, when the assembly of the second upper plate 111 and the second right plate 114 is described as an example, the plurality of assembly hooks 119*a* may be formed on a right surface of the second upper plate 111, and the plurality of assembly holes 119*b* may be formed on an upper surface of the second right plate 114 assembled to the right surface of the second upper plate 111. Although it is shown in the drawing that the plurality of assembly hooks 119*a* is formed on the right surface of the second upper plate 111 and the plurality of assembly holes 119*b* is formed on the upper surface of the second right plate 114, the plurality of assembly holes 119*b* may be formed on the right surface of the second upper plate 111, and the plurality of assembly hooks 119*a* may formed on the upper surface of the second right plate 114. As for the second lower plate 112, the plurality of assembly hooks 119*a* may be formed on the three edge surfaces.

Figure 7:
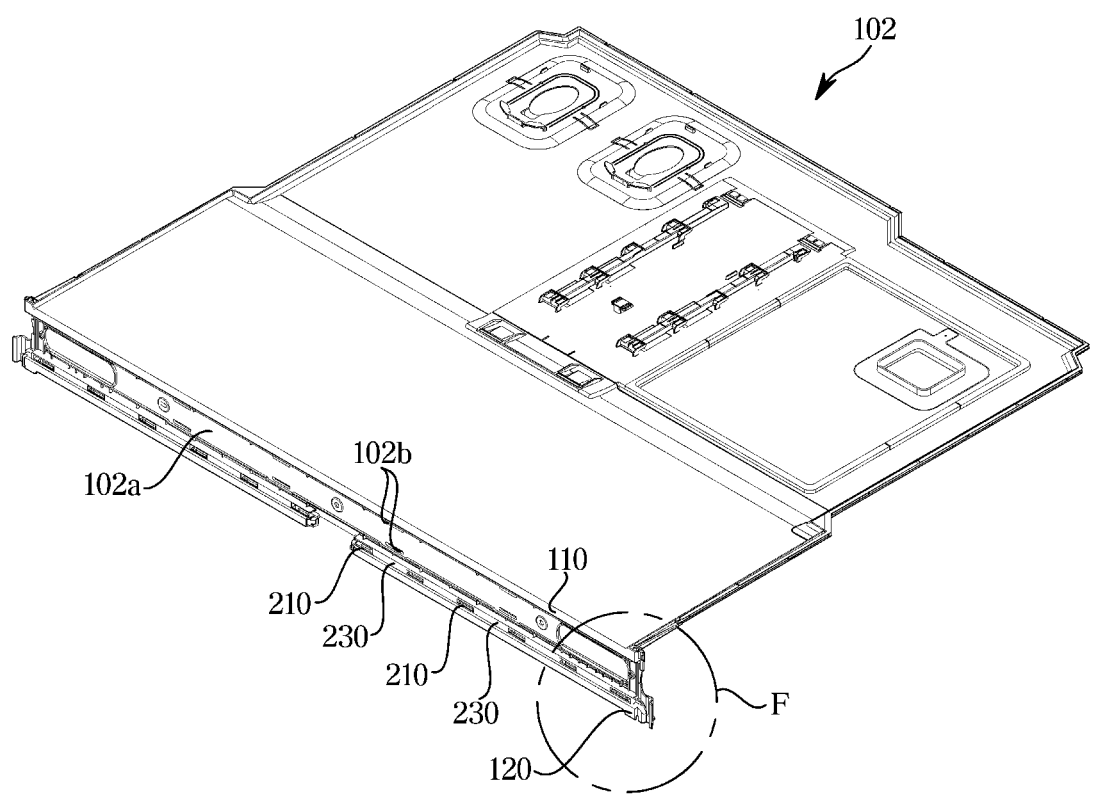
FIG. 7 is a view illustrating a first lower plate in FIG. 5.
Figure 8:
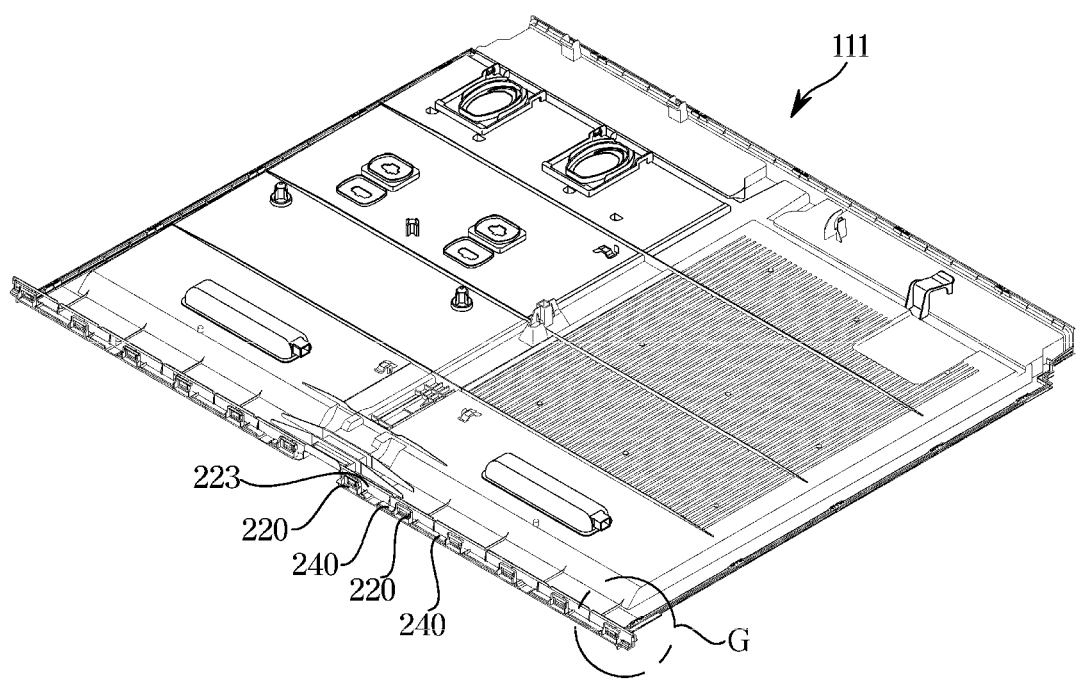
FIG. 8 is a view illustrating a second upper plate in FIG. 6.

FIG. 7 is a view illustrating the first lower plate in FIG. 5. FIG. 8 is a view illustrating the second upper plate in FIG. 6.

Referring to FIG. 7, the first lower plate 102 of the first inner case 100*a* according to an embodiment may include an extension 102*a*.

The extension 102*a* may extend downwardly from a front end of the first lower plate 102. The extension 102*a* may cover an entire surface of a space formed between the first inner case 100*a* and the second inner case 100*b* in response to the coupling of the first inner case 100*a* and the second inner case 100*b*. The insulating material 150 may be arranged in the separation space so as to form the first partition 17 shown in FIGS. 1 and 2.

Unlike shown in the drawings, the extension 102*a* may extend upwardly from the front end of the second upper plate 111. In this case, a position of a first coupler 210 and a position of a second coupler 220 to be described below may be changed to each other. In a similar manner, a position of a first sealing member 230 and a position of a second sealing member 240 may be changed to each other.

According to an embodiment, the extension 102*a* may include the first coupler 210 and the first sealing member 230. In addition, the first flange member 110 of the first inner case 100*a* may be provided at an upper end of the extension 102*a*, and the second flange member 120 of the second inner case 100*b* may be provided at a lower end of the extension 102*a*.

Referring to FIG. 8, according to an embodiment, the second upper plate 111 of the second inner case 100*b* may include the second coupler 220 and the second sealing member 240.

The second coupler 220 may be provided to be coupled to the first coupler 210. The second sealing member 240 may be provided to be coupled to the first sealing member 230. In response to the coupling of the second coupler 220 and the first coupler 210, the second sealing member 240 and the first sealing member 230 may be coupled to each other. In a similar manner, in response to the coupling of the first sealing member 230 and the second sealing member 240, the first coupler 210 and the second coupler 220 may be coupled to each other.

Due to the coupling of the first coupler 210 and the second coupler 220, and due to the coupling of the first sealing member 230 and the second sealing member 240, the first inner case 100*a* may be coupled to the second inner case 100*b* without the separation.

Due to the coupling of the first coupler 210 and the second coupler 220, it is possible to prevent the insulating material 150 foamed between the first inner case 100*a* and the second inner case 100*b* from being leaked between the first coupler 210 and the second coupler 220.

In addition, due to the coupling of the first sealing member 230 and the second sealing member 240, it is possible to prevent the insulating material 150 foamed between the first inner case 100*a* and the second inner case 100*b* from being leaked between the first sealing member 230 and the second sealing member 240.

Figure 9:
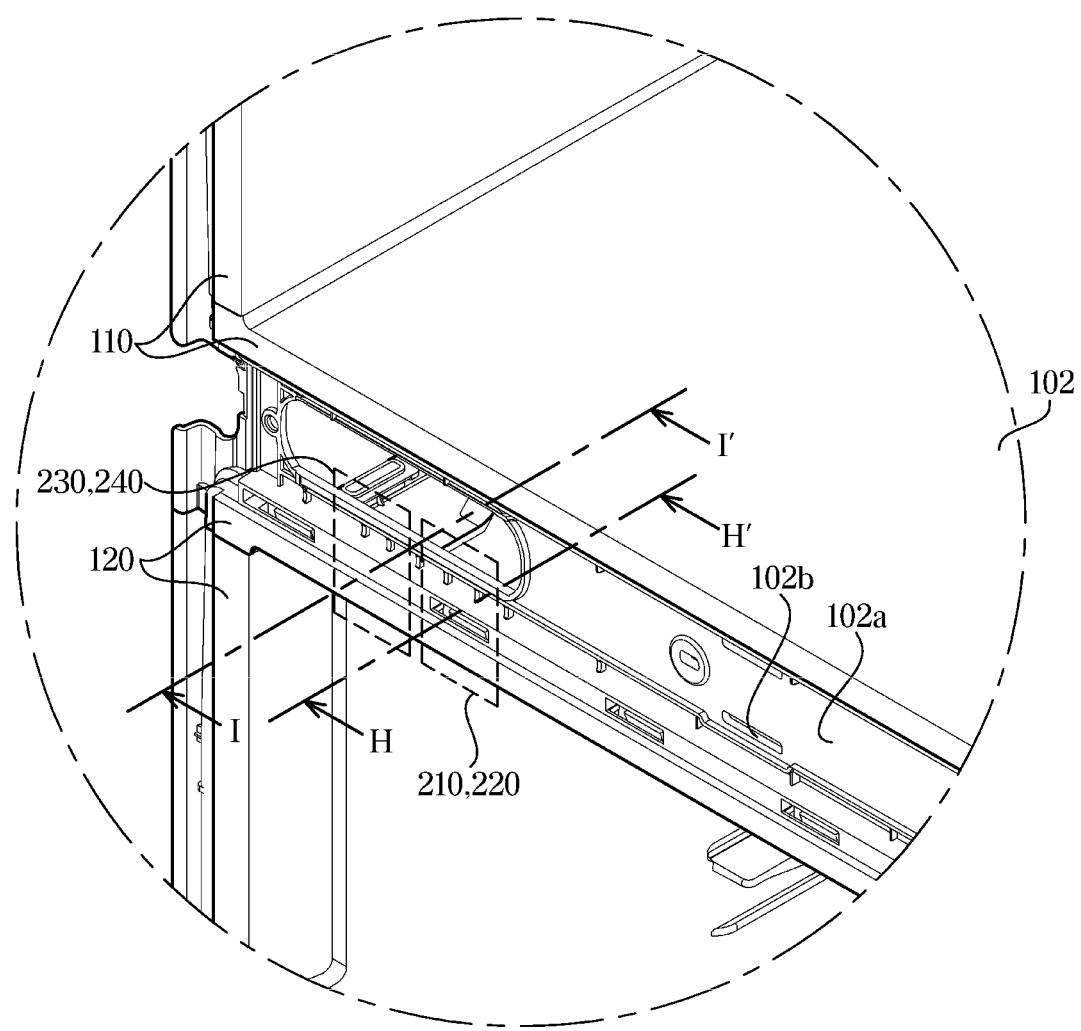
FIG. 9 is an enlarged view of a part B of FIG. 4.

FIG. 9 is an enlarged view of a part B of FIG. 4.

Referring to FIG. 9, in response to the coupling of the first inner case 100*a* and the second inner case 100*b*, the first coupler 210 and the second coupler 220 coupled to each other, and the first sealing member 230 and the second sealing member 240 coupled to each other may be arranged to be spaced apart from each other in the left and right directions. In other words, the first coupler 210 and the second coupler 220 coupled to each other, and the first sealing member 230 and the second sealing member 240 coupled to each other may be arranged to be laterally spaced apart from each other.

The first coupler 210 may include a plurality of first couplers 210 arranged to be laterally spaced apart from each other, and the second coupler 220 may include a plurality of second couplers 220 arranged to be laterally spaced apart from each other. In addition, the first sealing member 230 may include a plurality of first sealing members 230 arranged to laterally spaced apart from each other, and the second sealing member 240 may include a plurality of second sealing members 240 arranged to laterally spaced apart from each other.

The plurality of first couplers 210 and second couplers 220 coupled to each other, and the plurality of first and second sealing members 230 and 240 coupled to each other may be alternately arranged laterally.

Figure 10:
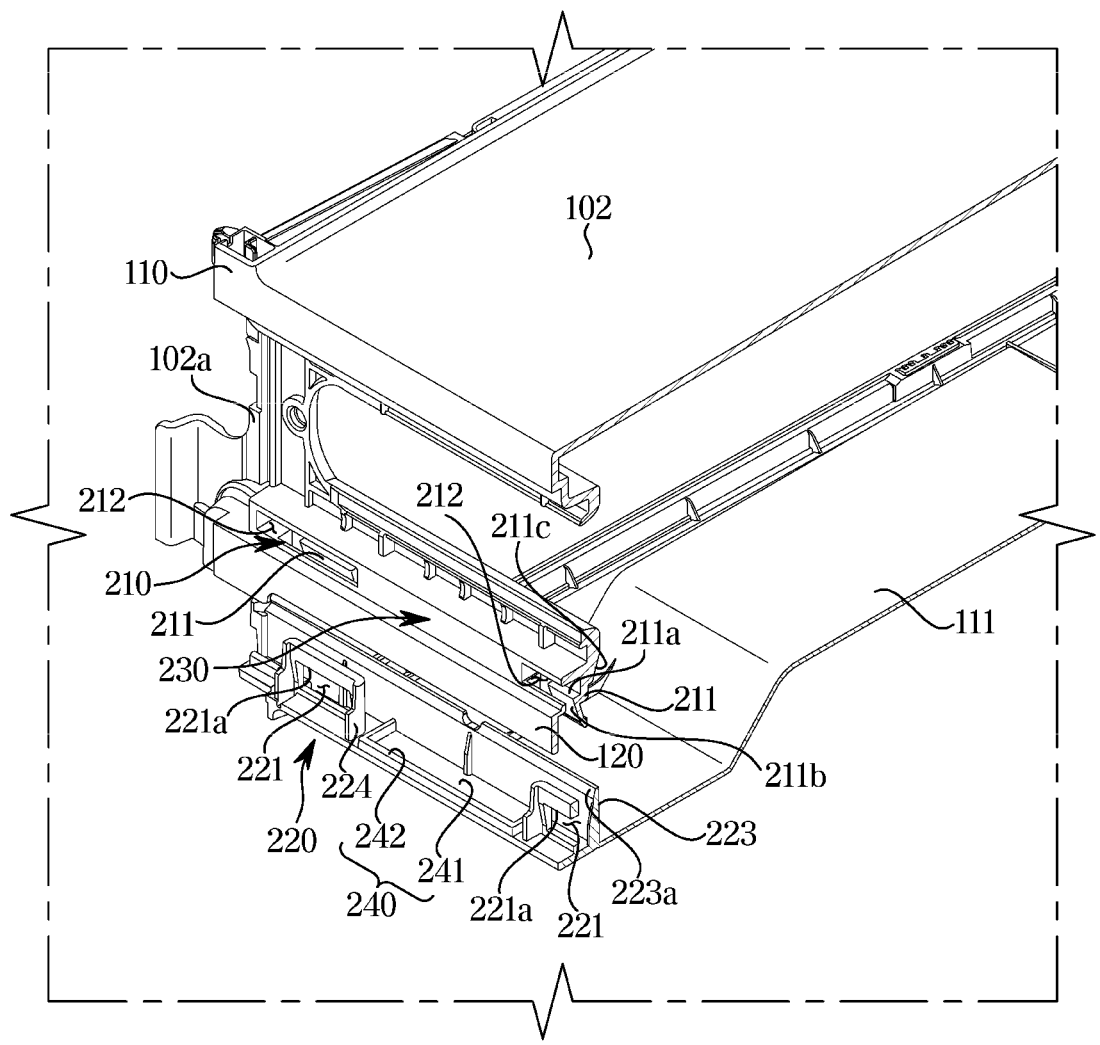
FIG. 10 is a cross-sectional perspective view taken along line H-H' of FIG. 9, illustrating a state before a first coupler and a second coupler are coupled to each other.
Figure 11:
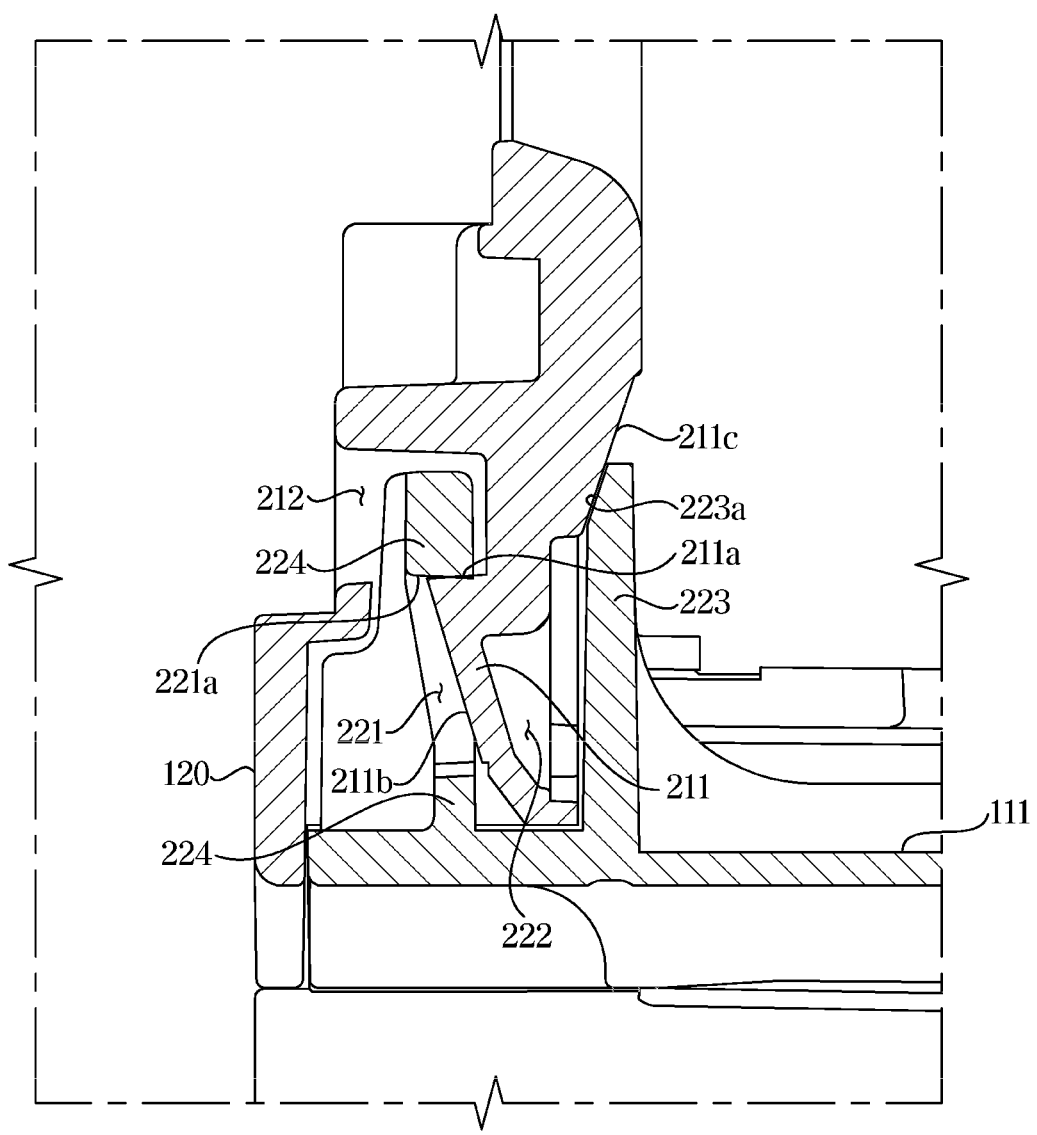
FIG. 11 is a cross-sectional perspective view taken along line H-H' of FIG. 9, illustrating a state after the first coupler and the second coupler are coupled to each other.

FIG. 10 is a cross-sectional perspective view taken along line H-H' of FIG. 9, illustrating a state before the first coupler and the second coupler are coupled to each other. FIG. 11 is a cross-sectional perspective view taken along line H-H' of FIG. 9, illustrating a state after the first coupler and the second coupler are coupled to each other.

Hereinafter a coupling structure of the first coupler and the second coupler according to an embodiment will be described with reference to FIGS. 10 and 11.

Referring to FIG. 10, the first coupler 210 may be provided on the extension 102*a* extending downwardly from the front end of the first lower plate 102. The first coupler 210 may include a first coupling protrusion 211.

The first coupling protrusion 211 may include an engaging member 211*a*, a guide 211*b*, and a first sealing surface 211*c*. The first coupler 210 may include an opening 212 provided above the flange 120 and opened toward the first coupling protrusion 211.

The second coupler 220 may include a first coupling hole 221 into which the first coupling protrusion 211 is inserted. The second coupler 220 may include an engaging surface 221*a* provided to form the first coupling hole 221 and come into contact with the engaging member 211*a*. The second coupler 220 may include a first protrusion 224 including the first coupling hole 221 and protruding upwardly from the front end of the second upper plate 111. In addition, the second coupler 220 may include a second protrusion 223 arranged to be spaced apart from the first protrusion 224 and protruding upwardly from the second upper plate 111. The second protrusion 223 may be arranged behind the first protrusion 224. The second protrusion 223 may include a second sealing surface 223a provided to be in contact with the first sealing surface 211c of the first coupling protrusion 211.

Referring to FIGS. 10 and 11, by moving the first inner case 100a downward toward the second inner case 100b, or by moving the second inner case 100b upward toward the first inner case 100a, the first coupler 210 and the second coupler 220 may be coupled to each other. Hereinafter an example in which the first inner case 100a moves downward and is coupled to the second inner case 100b will be described.

At least a portion of the first coupling protrusion 211 may be elastically deformed and inserted into the first coupling hole 221. In response to the insertion of the at least a portion of the first coupling protrusion 211 into the first coupling hole 221, the first coupling protrusion 211 may be coupled to the first coupling hole 221.

In response to the insertion of the first coupling protrusion 211 into the first coupling hole 221, the guide 211b of the first coupling protrusion 211 may be in contact with the first protrusion 224. The guide 211b may be provided to be inclined downwardly from the front to the rear. Due to the inclined surface of the guide 211b, the first coupling protrusion 211 may be elastically deformed to be inserted into the first coupling hole 221.

In response to the insertion of the at least portion of the first coupling protrusion 211 into the first coupling hole 221, the engaging member 211a of the first coupling protrusion 211 may come into contact with the engaging surface 221a of the first protrusion 224. As illustrated in FIG. 11, even when an external force is applied to move the first inner case 100a to the upper side, the first coupling protrusion 211 may not be drawn out from the first coupling hole 221 due to the contact between the engaging member 211a of the first coupling protrusion 211 and the engaging surface 221a of the first protrusion 224. That is, it is possible to couple the first inner case 100a and the second inner case 100b to each other so as to prevent the separation therebetween.

As a portion of the first coupling protrusion 211 is inserted into the first coupling hole 221 to allow the engaging member 211a to come into contact with the engaging surface 221a, the remaining part of the first coupling protrusion 211 may be received in a receiving groove 222 formed between the first protrusion 224 and the second protrusion 223. At this time, the first sealing surface 211c of the first coupling protrusion 211 and the second sealing surface 223a of the second protrusion 223 may be in contact with each other. The first sealing surface 211c and the second sealing surface 223a may be provided to have the same inclination angle. Accordingly, the insulating material 150 in a liquid state may not pass between the first sealing surface 211c and the second sealing surface 223a. In other words, by the coupling of the first coupler 210 and the second coupler 220, it is possible to prevent the insulating material 150 from leaked between the first coupler 210 and the second coupler 220.

In response to the insertion of the first coupling protrusion 211 into the receiving groove 222, the first sealing surface 211c may move along the second sealing surface 223a to guide the first coupling protrusion 211. The first coupling protrusion 211 may be elastically deformed by the guide 211b, and at least a portion of the first coupling protrusion 211 may be inserted into the first coupling hole 221. In response to the insertion of the at least a portion of the first coupling protrusion 211 into the first coupling hole 221, the first sealing surface 211c may move along the second sealing surface 223a to guide the first coupling protrusion 211 so as to allow the first coupling protrusion 211 to be received in the receiving groove 222.

In addition, in response to withdrawal of the first coupling protrusion 211 from the receiving groove 222, the first sealing surface 211c may move along the second sealing surface 223a to guide the first coupling protrusion 211. As described above, even when an external force is applied to withdraw the first coupling protrusion 211 from the receiving groove, the first coupling protrusion 211 may not be withdrawn from the receiving groove 222 due to the engaging member 211a and the engaging surface 221a because the first coupling protrusion 211 is received in the receiving groove 222. An opening 212 may be provided in front of the first coupling protrusion 211. In response to pressing the first coupling protrusion 211 backward through the opening 212 and the first coupling hole 221, the engagement between the engaging member 211a and the engaging surface 221a may be released. In response to the release of the engagement between the engaging member 211a and the engaging surface 221a, the first coupling protrusion 211 may move upward and be withdrawn from the receiving groove 222. At this time, the first sealing surface 211c may move along the second sealing surface 223a to guide the withdrawal of the first coupling protrusion 211.

Figure 12:
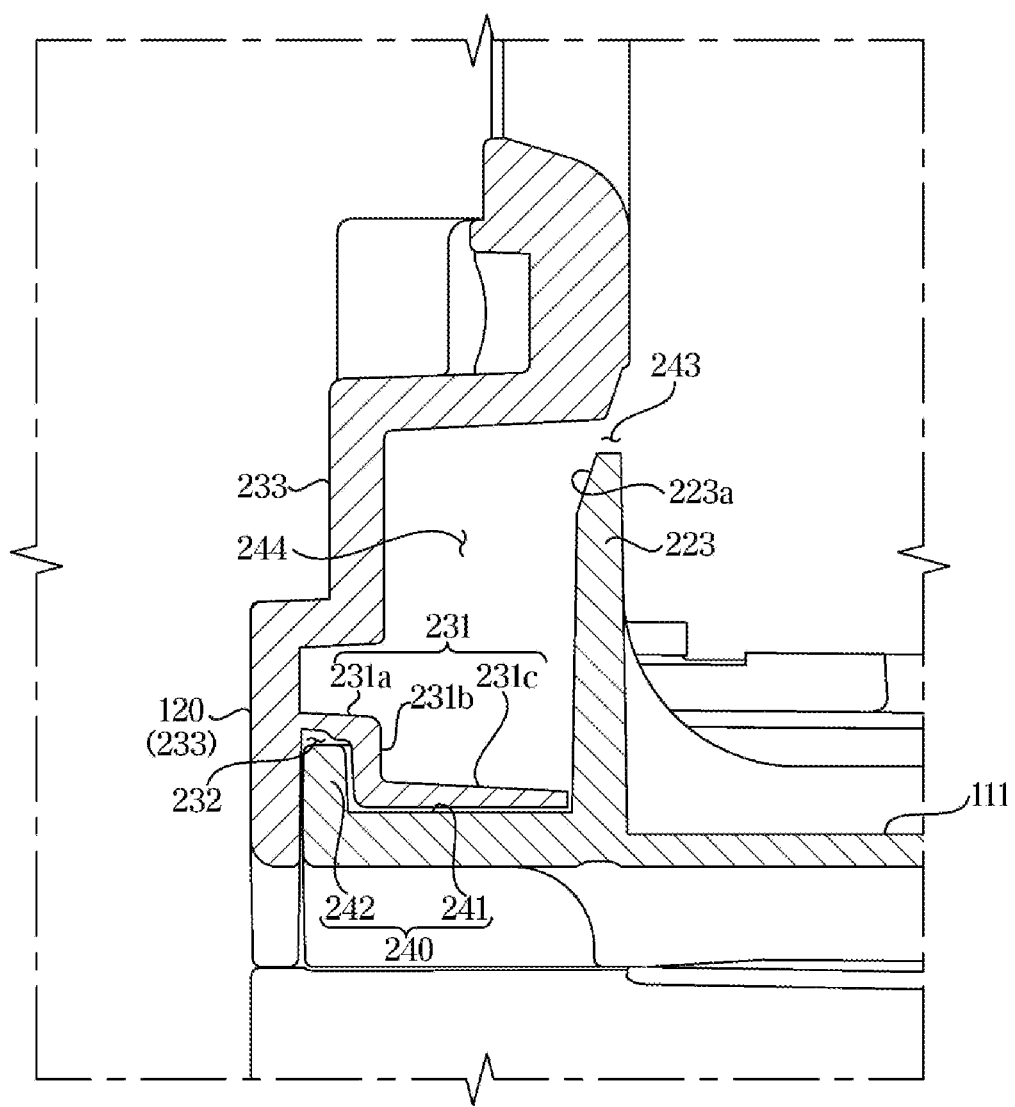
FIG. 12 is a cross-sectional view taken along line I-I' of FIG. 9, illustrating a state after a first sealing member and a second sealing member are coupled to each other.

FIG. 12 is a cross-sectional view taken along line I-I' of FIG. 9, illustrating a state after the first sealing member and the second sealing member are coupled to each other.

Hereinafter coupling structure of the first sealing member 230 and the second sealing member 240 according to an embodiment will be described with reference to FIGS. 10 and 12.

Referring to FIG. 10, the first sealing member 230 may not be exposed to the outside when viewed from the outside of the extension 102a. The first sealing member 230 may be provided above the flange 120.

The second sealing member 240 may include a support 241 and an insertion protrusion 242 formed along a circumference of the support 241. Together with the first sealing member 230, the support 241 and the insertion protrusion 242 may form a sealing space 244 (refer to FIG. 12) provided to accommodate the insulating material 150.

Referring to FIG. 12, the first sealing member 230 may include a cover 233 provided to cover a front surface of the sealing space 244. The cover 233 may include the flange 120. The first sealing member 230 may include a sealing protrusion 231 extending rearwardly from the cover 233. According to an embodiment, the sealing protrusion 231 may extend rearwardly from the flange 120, and may form an insertion groove 232 together with the flange 120.

Referring to FIG. 12, the insertion protrusion 242 of the second sealing member 240 may be inserted into the insertion groove 232 of the first sealing member 230. The sealing protrusion 231 may include a first protrusion 231a extending rearward of the flange 120, a connecter 231b extending downwardly from one end of the first protrusion 231a, and a second protrusion 231c extending rearwardly from one end of the connecter 231b.

Together with the flange 120, the first protrusion 231a and the connecter 231b may form the insertion groove 232. The second protrusion 231c may be provided to be mounted on the support 241. The second protrusion 231c may be arranged substantially parallel to the support 241.

In response to the insertion of the insertion protrusion 242 into the insertion groove 232, the first sealing member 230 and the second sealing member 240 may be coupled to each other. Based on the coupling of the first sealing member 230 and the second sealing member 240, the sealing space 244 may be formed. The first sealing member 230 and the second sealing member 240 may include an inlet 243 through which the insulating material 150 is introduced into the sealing space 244.

The insulating material 150, which is in a liquid state and foamed between the first inner case 100a and the second inner case 100b, may be introduced into the sealing space 244 through the inlet 243. The insulating material 150 introduced into the sealing space 244 may not be leaked to the outside of the sealing space 244. That is, the sealing space 244 may be provided to be sealed except for the inlet 243.

According to the disclosure, without a separate fastening member, it is possible to couple the first inner case and the second inner case with a simple structure.

Upon coupling the pre-manufactured first inner case 100a and the pre-manufactured second inner case 100b to each other, it is possible to couple the first inner case 100a and the second inner case 100b to each other by using the first coupler 210 and the second coupler 220, without a separate fastening member such as a screw. Further, after the first inner case 100a and the second inner case 100b are coupled to each other, the first inner case 100a and the second inner case 100b may not be separated even when an external force is applied in a direction opposite to a coupling direction.

In addition, based on the coupling of the first inner case 100a and the second inner case 100b, the insulating material 150 may not be leaked between the first coupler 210 and the second coupler 220. In a similar manner, based on the coupling of the first inner case 100a and the second inner case 100b, the insulating material 150 may not be leaked between the first sealing member 230 and the second sealing member 240.

Therefore, according to the disclosure, the first inner case 100a and the second inner case 100b, which are injection-molded and pre-manufactured inner cases, may be coupled to each other without a separate fastening member. Further, the first inner case 100a and the second inner case 100b may prevent the insulating material 150 from being leaked between the first inner case 100a and the second inner case 100b without a separate sealing member or sealing process. That is, it is possible to seal between the first inner case 100a and the second inner case 100b.

Figure 13:
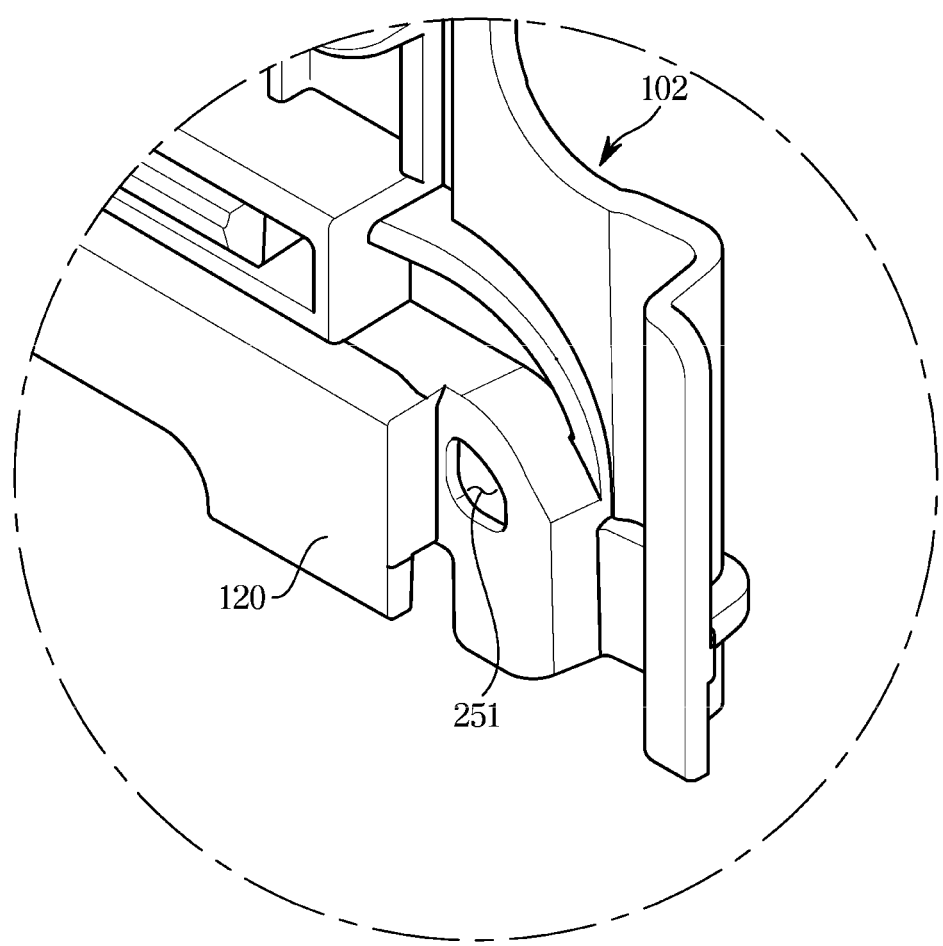
FIG. 13 is an enlarged view of a part F of FIG. 7.
Figure 14:
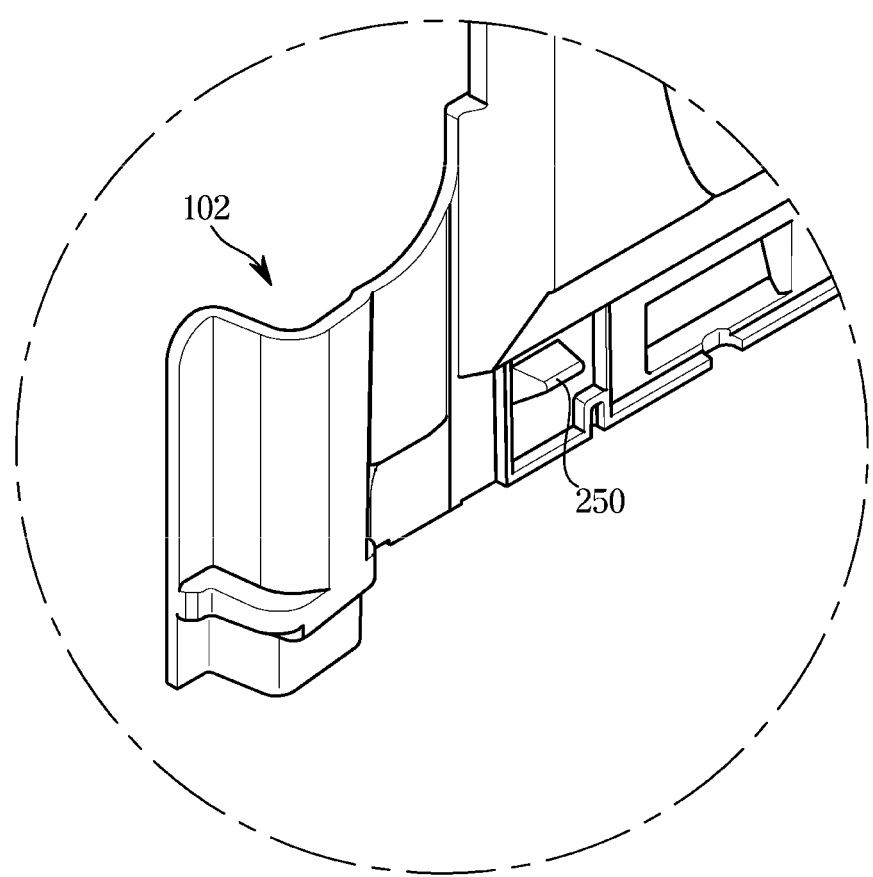
FIG. 14 is a view illustrating FIG. 13 from another angle.
Figure 15:
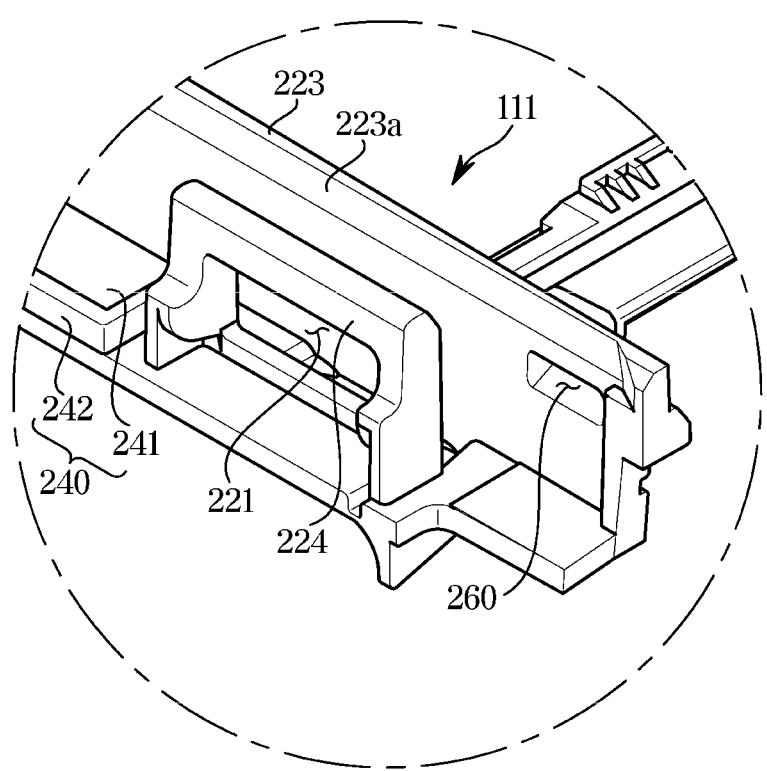
FIG. 15 is an enlarged view of a part G of FIG. 8.
Figure 16:
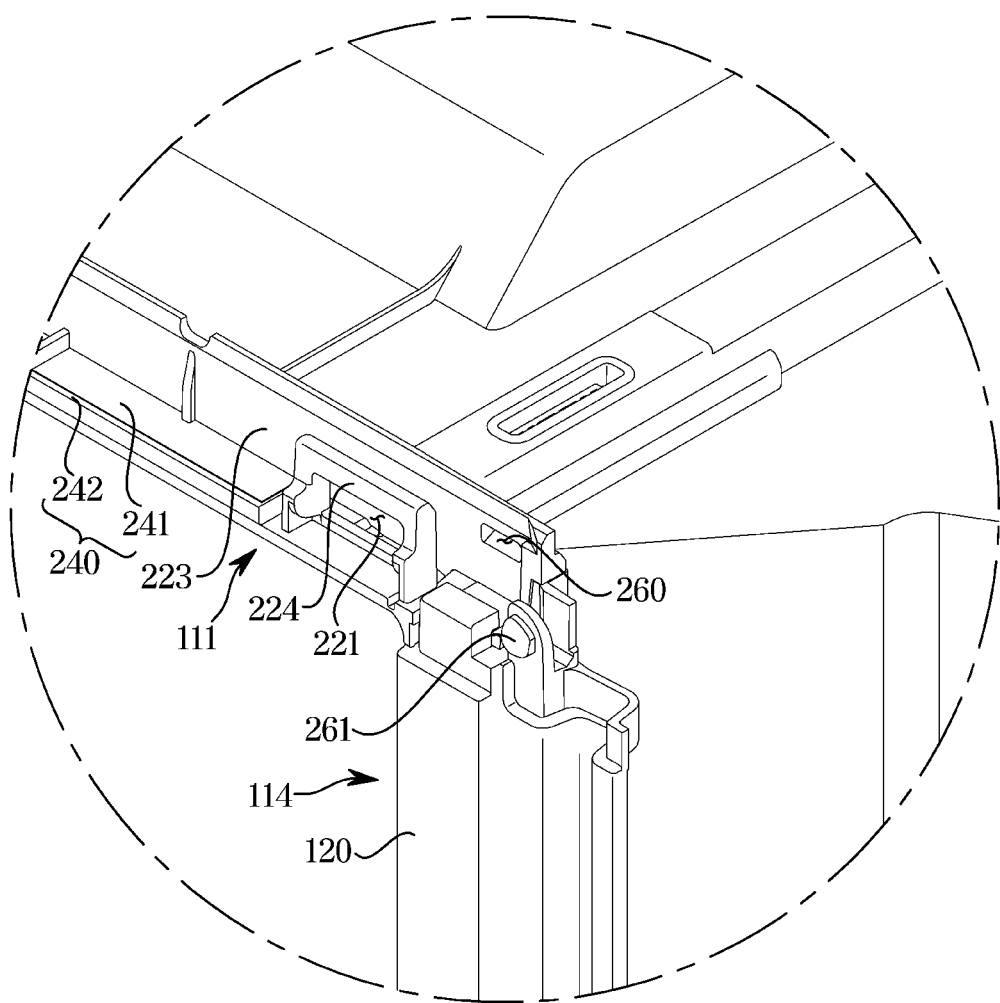
FIG. 16 is an enlarged view of a part A of FIG. 3.
Figure 17:
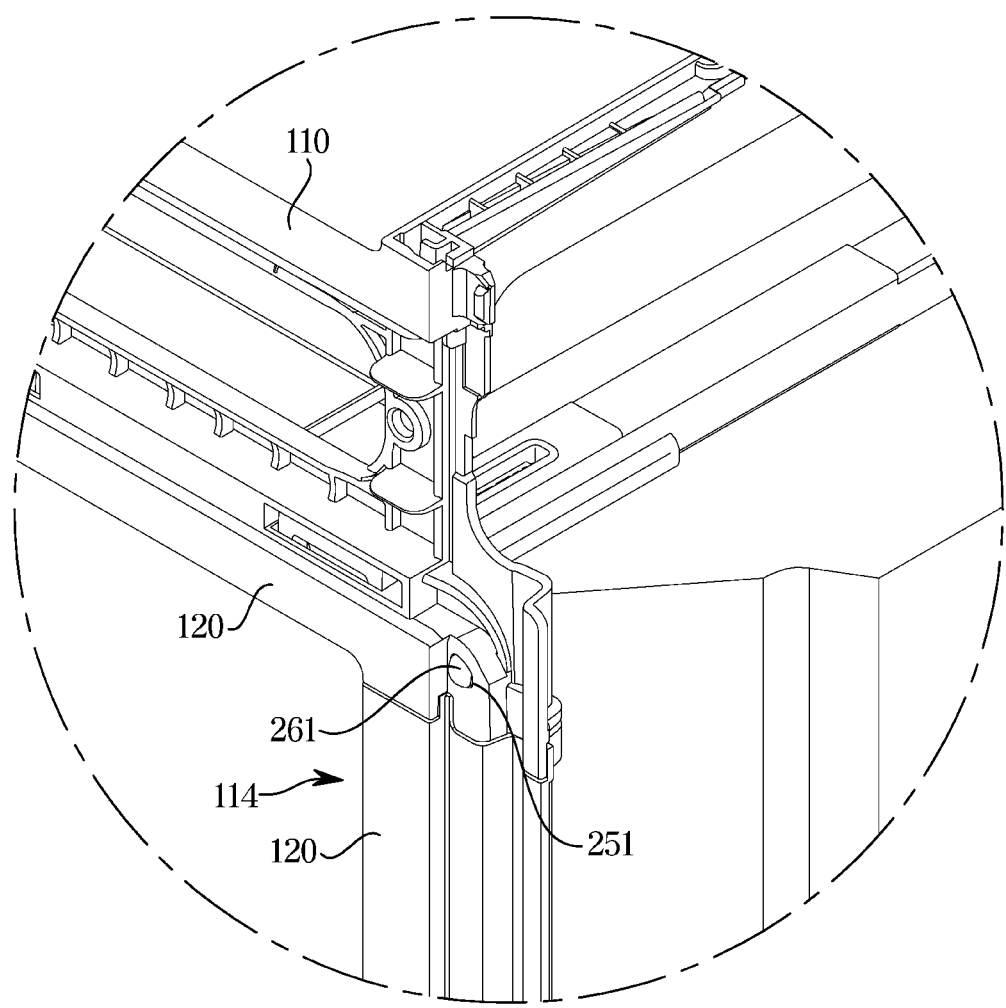
FIG. 17 is an enlarged view of a part D of FIG. 4.

FIG. 13 is an enlarged view of a part F of FIG. 7. FIG. 14 is a view illustrating FIG. 13 from another angle. FIG. 15 is an enlarged view of a part G of FIG. 8. FIG. 16 is an enlarged view of a part A of FIG. 3. FIG. 17 is an enlarged view of a part D of FIG. 4.

Referring to FIGS. 13 and 14, according to an embodiment, the first lower plate 102 may further include a second coupling protrusion 250 and a second coupling hole 251. Referring to FIG. 15, the second upper plate 111 may further include a coupling groove 260 into which the second coupling protrusion 250 is inserted. Referring to FIG. 16, each of the second right plate 114 and the second left plate 113 (refer to FIG. 6) may further include a third coupling protrusion 261.

The second coupling protrusion 250 may be provided on a rear surface of the extension 102a. Particularly, the second coupling protrusion 250 may be provided as a pair on opposite sides of the extension 102a, and may protrude rearwardly from the rear surface of the extension 102a.

The second coupling protrusion 250 may be inserted into and coupled to the coupling groove 260. The coupling groove 260 may be provided to correspond to the number of the second coupling protrusions 250. According to an embodiment, the coupling groove 260 may be provided in pairs on opposite sides of the second upper plate 111. One of the pair of coupling grooves 260 may be provided on one side of the first protrusion 224 provided on the outermost side on one side of the second upper plate 111, and the other of the pair of coupling grooves 260 may be provided on the other side of the first protrusion 224 provided on the outermost side on the other side of the second upper plate 111.

According to an embodiment, it is possible to increase the coupling force between the first lower plate 102 and the second upper plate 111 by additional coupling of the second coupling protrusion 250 and the coupling groove 260 as well as the coupling of the first coupling protrusion 211 and the first coupling hole 221. Accordingly, it is possible to stably couple the first lower plate 102 and the second upper plate 111 to each other without a separate fastening member other than the first lower plate 102 and the second upper plate 111.

The first lower plate 102 may include the second coupling hole 251. The second coupling hole 251 may be provided as a pair on opposite sides of the extension 102a.

Referring to FIG. 16, the second right plate 114 may further include the third coupling protrusion 261. The third coupling protrusion 261 may be provided on the front edge of the second right plate 114. Particularly, the third coupling protrusion 261 may be provided on the upper side of the second flange member 120 of the second right plate 114. The second left plate 113 (refer to FIG. 6) may further include a third coupling protrusion (not shown). In the same manner as the second right plate 114, the second left plate 113 may further include a third coupling protrusion provided on the upper side of the second flange 120 of the second left plate 113.

Referring to FIG. 17, the third coupling protrusion 261 may be inserted into the second coupling hole 251. By inserting the third coupling protrusion 261 provided on the second right plate 114 into the second coupling hole 251 provided on one side of the extension 102a, the first lower plate 102 may be coupled to the second right plate 114. In addition, by inserting the third coupling protrusion (not shown) provided on the second left plate 113 into the second coupling hole (not shown) provided on the other side of the extension 102a, the first lower plate 102 may be coupled to the second left plate 113.

According to an embodiment, the first lower plate 102 and the second right plate 114 may be directly coupled through the third coupling protrusion 261 and the second coupling hole 251, and thus it is possible to increase the coupling force between the first lower plate 102 and the second right plate 114. In a similar manner, the first lower plate 102 and the second left plate 113 may be directly coupled through the third coupling protrusion (not shown) and the second coupling hole (not shown), and thus it is possible to increase the coupling force between the first lower plate 102 and the second left plate 113. Accordingly, it is possible to stably couple the first inner case 100a to the second inner case 100b without a separate fastening member.

Figure 18:
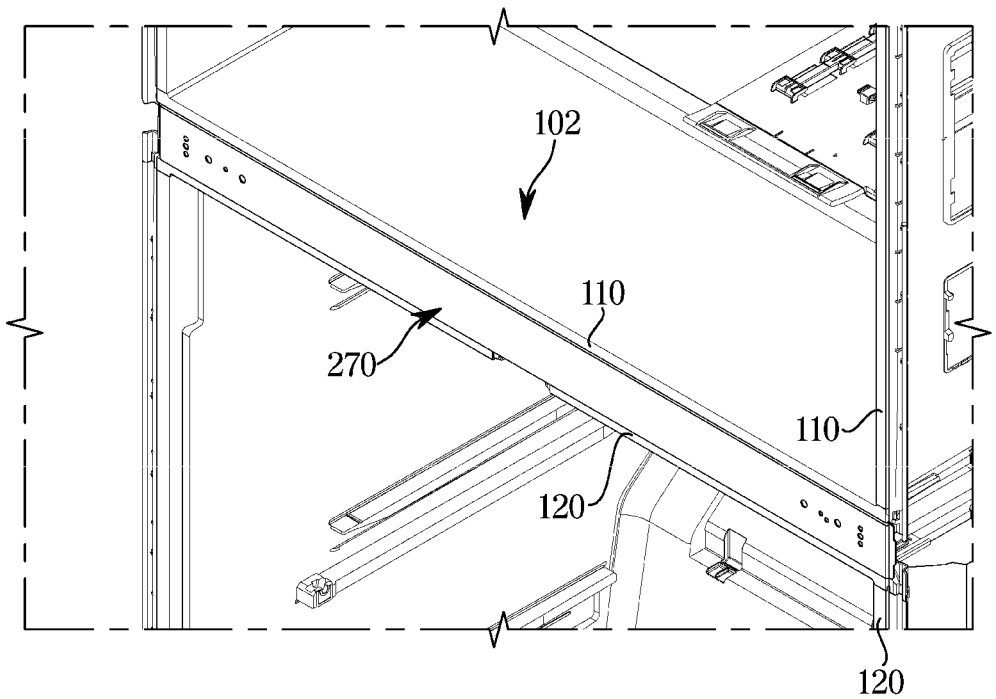
FIG. 18 is a view illustrating a state in which a flange plate is coupled to an extension in the refrigerator according to an embodiment of the disclosure.
Figure 19:
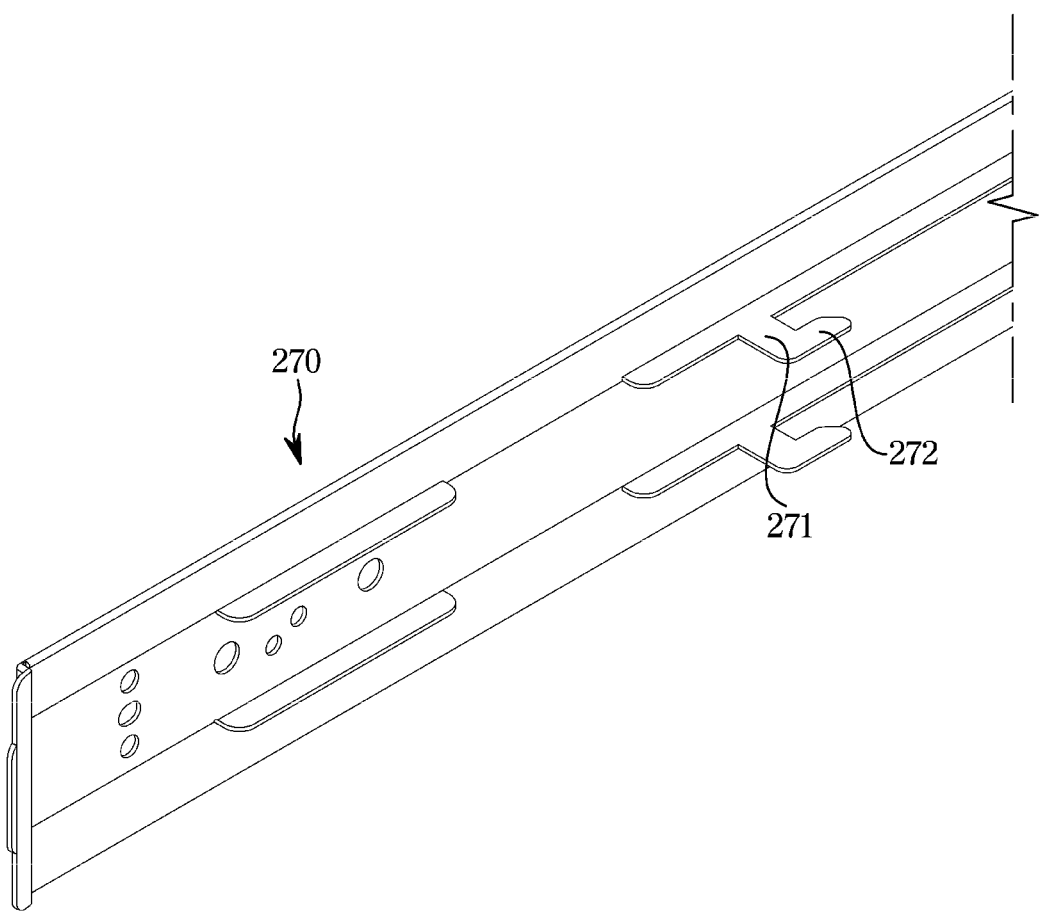
FIG. 19 is an enlarged view illustrating a rear surface of the flange plate in the refrigerator according to an embodiment of the disclosure.
Figure 20:
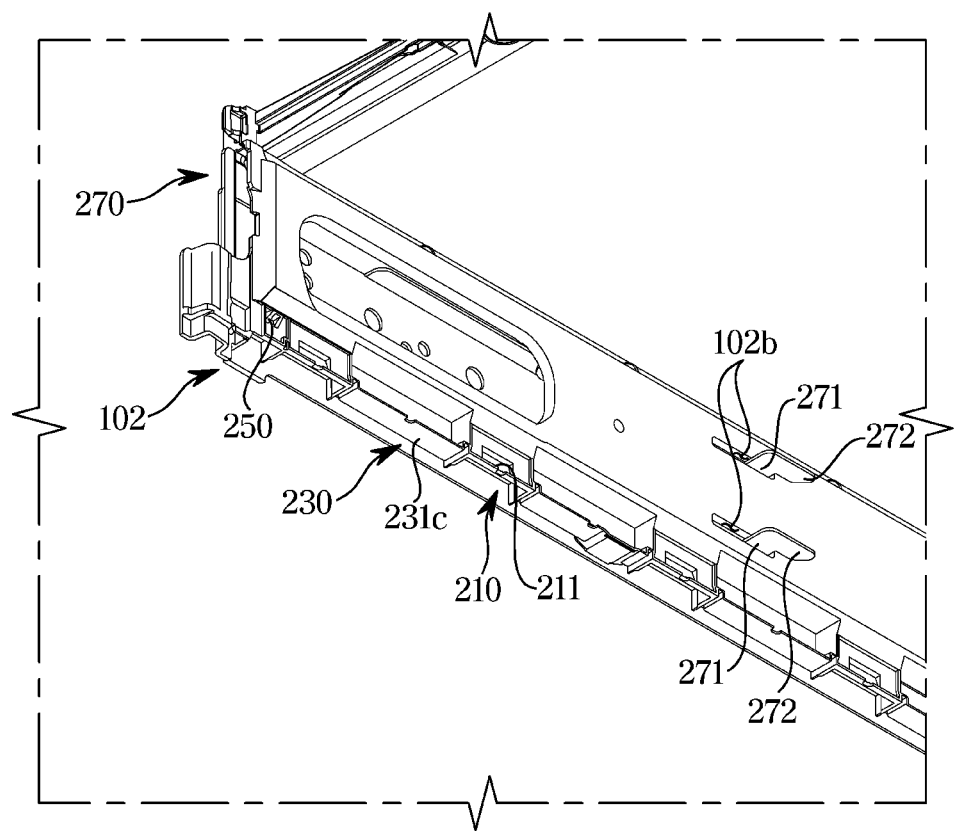
FIG. 20 is a view illustrating the extension, to which the flange plate is coupled, in the refrigerator according to an embodiment of the disclosure, when viewed from the rear side.

FIG. 18 is a view illustrating a state in which a flange plate is coupled to the extension in the refrigerator according to an embodiment of the disclosure. FIG. 19 is an enlarged view illustrating a rear surface of the flange plate in the refrigerator according to an embodiment of the disclosure. FIG. 20 is a view illustrating the extension, to which the flange plate is coupled, in the refrigerator according to an embodiment of the disclosure, when viewed from the rear side.

Referring to FIGS. 18 to 20, according to an embodiment, the refrigerator may further include a flange plate 270 provided to be coupled to the extension 102*a* to connect the first flange member 110 to the second flange member 120 of the extension 102*a*.

The flange plate 270 may be coupled to the extension 102*a* to be arranged between the first flange member 110 of the extension 102*a* and the second flange member 120 of the extension 102*a*. A plurality of holes or protrusions may be provided in the extension 102*a*. The flange plate 270 may be provided to cover the hole or the protrusion of the extension 102*a*. The flange plate 270 may be coupled to the extension 102*a*, thereby forming the first partition 17 (refer to FIG. 1).

Referring to FIG. 19, the flange plate 270 may include engaging protrusions 271 and 272 provided on the rear surface thereof. The engaging protrusions 271 and 272 may be provided in plurality.

Referring to FIGS. 19 and 20, the engaging protrusions 271 and 272 may be provided to be inserted into an engaging hole 102*b* provided in the extension 102*a*. The engaging protrusions 271 and 272 may include an insertion member 271 extending rearwardly from the rear surface of the flange plate 270 to be inserted into the engaging hole 102*b*, and a hook 272 extending laterally from the insertion member 271 to prevent the flange plate 270 from being separated from the extension 102*b*.

The engaging protrusions 271 and 272 may be coupled to the engaging hole 102*b* in such a way that the hook 272 passes through the engaging hole 102*b* and the engaging protrusions 271 and 272 slide in a direction, in which the hook 272 extends, by a predetermined distance with respect to the extension 102*a*.

The extension 102*a* and the flange plate 270 may include the plurality of engaging holes 102*b* and the plurality of engaging protrusions 271 and 272 for stable coupling of the flange plate 270 and the extension 102*a*. According to an embodiment, eight of the plurality of engaging protrusions 271 and 272 and the plurality of engaging holes 102*b* may be provided, respectively, but the number and arrangement thereof may vary.

Figure 21:
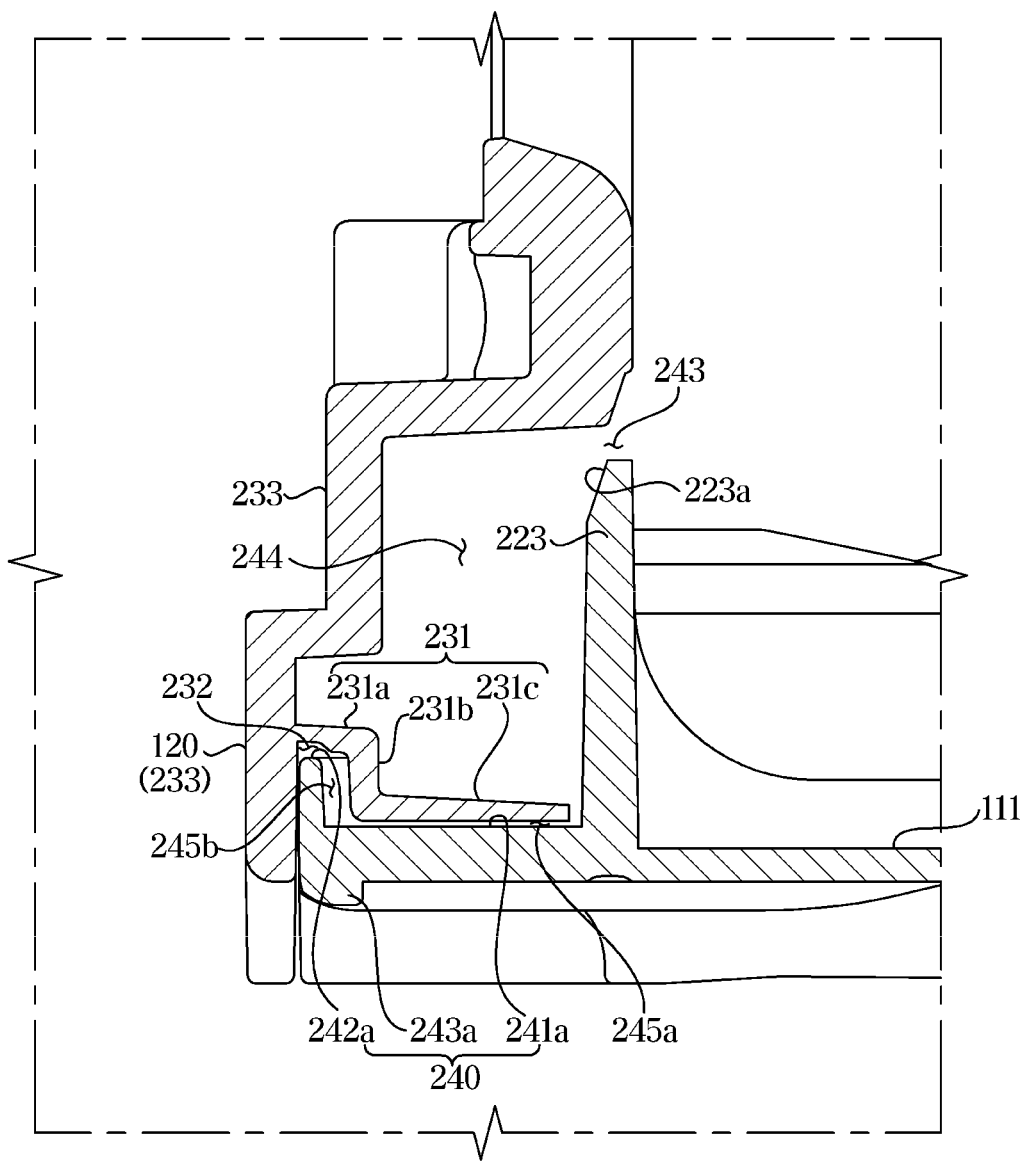
FIG. 21 is a side cross-sectional view of a first sealing member and a second sealing member coupled to each other in the refrigerator according to an embodiment of the disclosure.

FIG. 21 is a side cross-sectional view of a first sealing member and a second sealing member coupled to each other in the refrigerator according to an embodiment of the disclosure.

The first sealing member and the second sealing member including a structure different from that of the embodiment shown in FIG. 12 will be described in detail with reference to FIG. 21. Except for a support 241*a*, an insertion protrusion 242*a*, and a pressing member 243*a* of the second upper plate 111, the remaining components may be provided in the same manner as in the embodiment shown in FIG. 12.

According to an embodiment, a predetermined free space 245*b* may be provided in the insertion groove 232 to allow the insertion protrusion 242*a* to move backward in response to insertion of the insertion protrusion 242*a* into the insertion groove 232. In order to form the free space 245*b* in the insertion groove 232, the insertion groove 232 may be formed to be relatively large, otherwise, the size of the insertion protrusion 242*a* may be reduced. According to an embodiment, by reducing a thickness of the insertion protrusion 242*a* in the front and rear direction, the free space 245*b* may be provided in the insertion groove 232.

According to an embodiment, the second storage compartments 23 and 24 formed by the second inner case 100*b* may be used as the freezing compartment. Because an internal temperature of the freezing compartment is maintained below 0° C. (zero), the second upper plate 111 of the second inner case 100*b* forming the second storage compartments 23 and 24 may be contracted. Due to the temperature change from a room temperature to the internal temperature of the freezing compartment, the second upper plate 111 may be contracted. Due to the contraction of the second upper plate 111, the second upper plate 111 may slightly move backward. Due to the backward movement of the second upper plate 111, the insertion protrusion 242*a* may move backward. As described above, the free space 245*b* may be provided in the insertion groove 232 to allow the insertion protrusion 242*a* to move backward. Accordingly, even when the insertion protrusion 242*a* moves backward due to the contraction of the second upper plate 111, the first lower plate 102 may prevent the deformation of the second upper plate 111.

According to an embodiment, the second upper plate 111 may further include the pressing member 243*a* protruding downwardly from a lower surface of the support 241*a*. The pressing member 243*a* may be provided under the insertion protrusion 242*a*.

In response to the foaming of the insulating material 150, the pressing member 243*a* may be pressed by a foam mold. The pressing member 243*a* may be provided to be pressed upward, and by the pressing member 243*a* being pressed upward, the insulating material 150 may be prevented from being leaked to the outside of the sealing space 244 through a gap between the sealing protrusion 231 and the support 241*a*.

Particularly, in response to the upward movement of the pressing member 243*a* by the foam mold, the support 241*a* and the insertion protrusion 242*a* may slightly move upward. Due to the upward movement of the support 241*a* and the insertion protrusion 242*a*, a gap 245*a* provided between the support 241*a* and the sealing protrusion 231 may be removed. In other words, the gap 245*a* between the support 241*a* and the sealing protrusion 231 may be removed by the contact between the support 241*a* and the second protrusion 231*c* of the sealing protrusion 231, and thus, the insulating material 150 may not be leaked through the gap 245*a*.

As is apparent from the above description, when loading and storing an inner case, a refrigerator may store a large number of inner cases in the same space by allowing the inner case to be disassembled, and may transport the large number of inner cases at a time.

A refrigerator may include an inner case formed by assembling parts formed by an injection molding method.

A refrigerator may couple a pair of inner cases, which is separated from each other, by using a simple structure, without a separate fastening member.

A refrigerator may prevent an insulating material, which is foamed in a space between a pair of inner cases, from being leaked through a coupler provided to couple the pair of inner cases to each other.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:
1. A refrigerator comprising:
a first inner case comprising a first upper plate, a first lower plate, a first left plate, a first right plate, and a first rear plate;
a first storage compartment formed by the first inner case;

a second inner case comprising a second upper plate, a second lower plate, a second left plate, a second right plate, and a second rear plate, and to be coupled to the first inner case;
a second storage compartment formed by the second inner case;
an outer case coupled to an outer side of the first inner case and an outer side of the second inner case to form an exterior of the refrigerator; and
an insulating material provided between the first inner case and the outer case, and between the second inner case and the outer case,
wherein:
one of the first lower plate and the second upper plate comprises;
an extension extending from the one of the first lower plate and the second upper plate, the extension including a first coupler having a first coupling protrusion protruding from the extension; and
a second coupling protrusion protruding from a rear surface of the extension in a direction opposite to a protruding direction of the first coupling protrusion;
an other one of the first lower plate and the second upper plate comprises:
a second coupler comprising:
a first coupling hole to allow at least a portion of the first coupling protrusion to be inserted thereinto so that the second coupler is coupled to the first coupler; and
a coupling groove into which the second coupling protrusion is inserted to be coupled to the second coupling protrusion; and
the first lower plate is coupled to the second upper plate by coupling the first coupler to the second coupler to prevent the insulating material from leaking between the first coupler and the second coupler.

2. The refrigerator of claim 1, wherein
the second coupler comprises:
a first protrusion having the first coupling hole formed therein, and protruding from the second upper plate; and
a second protrusion spaced apart from the first protrusion to form a receiving groove between the first protrusion and the second protrusion, and protruding from the second upper plate.

3. The refrigerator of claim 2, wherein
the first coupling protrusion comprises a first sealing surface inclined at a first angle; and
the second protrusion comprises:
a second sealing surface provided in the second protrusion of the second coupler, is inclined at the first angle, and to be in contact with the first sealing surface, and
wherein the insulating material is prevented from passing between the first sealing surface and the second sealing surface in response to contact between the first sealing surface and the second sealing surface.

4. The refrigerator of claim 1, wherein
the extension further comprises a second coupling hole arranged adjacent to one side end of the extension and a third coupling hole arranged adjacent to an other side end of the extension,
one of the first left plate and the second left plate comprises a third coupling protrusion corresponding to the second coupling hole to be inserted into the second coupling hole so that the one of the first left plate and the second left plate is coupled to the extension, and
one of the first right plate and the second right plate comprises a fourth coupling protrusion corresponding to the third coupling hole to be inserted into the third coupling hole so that the one of the first right plate and the second right plate is coupled to the extension.

5. The refrigerator of claim 1, wherein
the extension comprises:
a first flange member forming a portion of a front edge of the first inner case; and
a second flange member forming a portion of a front edge of the second inner case.

6. The refrigerator of claim 5, further comprising:
a flange plate coupled to the extension to be arranged between the first flange member and the second flange member to connect the first flange member to the second flange member.

7. The refrigerator of claim 6, wherein
the flange plate comprises an engaging protrusion provided on a rear surface of the flange plate, and the extension further comprises an engaging hole to allow the engaging protrusion to be inserted thereto.

8. The refrigerator of claim 7, wherein
the engaging protrusion comprises:
an insertion member extending rearwardly from the rear surface of the flange plate to be inserted into the engaging hole; and
a hook extending laterally from the insertion member and engaged to the extension to prevent the flange plate from being separated from the extension.

9. A refrigerator comprising:
a first inner case comprising a first upper plate, a first lower plate, a first left plate, a first right plate, and a first rear plate;
a first storage compartment formed by the first inner case;
a second inner case comprising a second upper plate, a second lower plate, a second left plate, a second right plate, and a second rear plate, and to be coupled to the first inner case;
a second storage compartment formed by the second inner case;
an outer case coupled to an outer side of the first inner case and an outer side of the second inner case to form an exterior of the refrigerator; and
an insulating material provided between the first inner case and the outer case, and between the second inner case and the outer case,
wherein:
one of the first lower plate and the second upper plate comprises:
an extension extending from the one of the first lower plate and the second upper plate, the extension including a first coupler; and
a first sealing member arranged on a lateral side of the first coupler, the first sealing member including:
a cover forming a front portion thereof;
a sealing protrusion forming a lower portion of the first sealing member by protruding rearwardly from the cover; and
an insertion groove formed on a bottom surface of the sealing protrusion;
an other one of the first lower plate and the second upper plate comprises:
a second coupler to be coupled to the first coupler; and a second sealing member arranged on a lateral side of the second coupler and coupled to the first sealing member to form a sealing space in which the insulating material is received to prevent leakage of the insulating material; and the first lower plate is coupled to the second upper plate by coupling the first coupler to the second coupler to prevent the insulating material from leaking between the first coupler and the second coupler.

10. The refrigerator of claim 9, wherein the second sealing member comprises:
a support arranged under the sealing protrusion to support the sealing protrusion; and
an insertion protrusion protruding from the support and to be inserted into the insertion groove.

11. The refrigerator of claim 10, wherein a space is formed between the insertion protrusion and the insertion groove to allow the insertion protrusion to be movable therein in response to insertion of the insertion protrusion into the insertion groove.

12. The refrigerator of claim 10, wherein the second sealing member further comprises a pressing member protruding from a bottom surface of the support, and
in response to the pressing member being pressed, the insulating material is prevented from leaking to an outside of the sealing space through a gap between the sealing protrusion and the support.

13. A refrigerator, comprising:
a first inner case including a first upper plate, first side plates, and a first lower plate;
a first storage compartment formed by the first inner case;
a second inner case including a second upper plate, second side plates, and a second upper plate;
a second storage compartment formed by the second inner case;
an outer case coupled to an outer side of the first inner case and an outer side of the second inner case to form an exterior of the refrigerator; and
an insulating material provided between the first inner case and the outer case, and between the second inner case and the outer case,
wherein the first lower plate includes:
an extension extending downwardly from the first lower plate;
a first coupling protrusion protruding from the extension, and including a first sealing surface provided in the extension and inclined at a first angle; and
a second coupling protrusion protruding from a rear surface of the extension in a direction opposite to a protruding direction of the first coupling protrusion;
the second upper plate includes:
a coupling hole into which the first coupling protrusion is inserted;
a second sealing surface provided to be in contact with the first sealing surface and inclined at the first angle; and
a coupling groove into which the second coupling protrusion to be inserted and coupled to the second coupling protrusion; and
the first sealing surface is in contact with the second sealing surface to prevent the insulating material from leaking between the first lower plate and the second upper plate in response to the insertion of the first coupling protrusion into the coupling hole.

14. The refrigerator of claim 13, wherein the first lower plate further includes a first sealing member arranged on a lateral side of the first coupling protrusion, and
wherein the second upper plate further includes a second sealing member arranged on a lateral side of the coupling hole and coupled to the first sealing member to form a sealing space in which the insulating material is received to prevent leakage of the insulating material.

15. The refrigerator of claim 13, wherein the extension includes a first flange member forming a portion of a front edge of the first inner case, and a second flange member forming a portion of a front edge of the second inner case.

16. The refrigerator of claim 15, wherein the refrigerator further includes a flange plate coupled to the extension to be arranged between the first flange member and the second flange member, and
wherein the flange plate to be coupled to the extension so as to connect the first flange member to the second flange member.

* * * * *